United States Patent
Wang et al.

(10) Patent No.: US 12,389,248 B2
(45) Date of Patent: Aug. 12, 2025

(54) COMMUNICATION METHOD AND APPARATUS

(71) Applicant: HUAWEI TECHNOLOGIES CO., LTD., Shenzhen (CN)

(72) Inventors: Feng Wang, Beijing (CN); Lixia Xue, Beijing (CN); Xu Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 327 days.

(21) Appl. No.: 17/890,528

(22) Filed: Aug. 18, 2022

(65) Prior Publication Data

US 2022/0394526 A1    Dec. 8, 2022

Related U.S. Application Data

(63) Continuation of application No. PCT/CN2020/087320, filed on Apr. 27, 2020.

(30) Foreign Application Priority Data

Feb. 18, 2020 (WO) .............. PCT/CN2020/075764

(51) Int. Cl.
*H04W 24/08* (2009.01)
*H04W 56/00* (2009.01)
*H04W 68/00* (2009.01)
*H04W 72/0446* (2023.01)
*H04W 72/23* (2023.01)
*H04W 72/542* (2023.01)

(52) U.S. Cl.
CPC ......... *H04W 24/08* (2013.01); *H04W 56/001* (2013.01); *H04W 68/005* (2013.01); *H04W 72/0446* (2013.01); *H04W 72/23* (2023.01); *H04W 72/542* (2023.01)

(58) Field of Classification Search
CPC .............................. H04W 24/08; H04W 72/23
USPC ......................................................... 370/329
See application file for complete search history.

(56) References Cited

U.S. PATENT DOCUMENTS

2019/0253308 A1* 8/2019 Huang ................ H04L 43/0823
2019/0254071 A1    8/2019 Park

FOREIGN PATENT DOCUMENTS

| CN | 109076556 A | 12/2018 |
|---|---|---|
| CN | 110299978 A | 10/2019 |
| CN | 110690947 A | 1/2020 |

(Continued)

OTHER PUBLICATIONS

3GPP TSG RAN Meeting #86,RP-193239,New WID: UE Power Saving Enhancements,MediaTek Inc.,Sitges, Spain, Dec. 9-12, 2019,total 5 pages.

(Continued)

*Primary Examiner* — Angel T Brockman
(74) *Attorney, Agent, or Firm* — Hauptman Ham, LLP

(57) ABSTRACT

A network device sends at least one piece of DCI on a PDCCH monitoring occasion of a first PO, where all or a part of the at least one piece of DCI includes first indication information, each piece of first indication information indicates that at least one CSI-RS is available, the CSI-RS corresponds to an SSB, and the SSB corresponds to a PDCCH monitoring occasion for sending the DCI including the first indication information. The network device sends the CSI-RS indicated by the first indication information as available.

20 Claims, 5 Drawing Sheets

(56) References Cited

FOREIGN PATENT DOCUMENTS

EP            3484057 A1     5/2019
WO     WO-2018129300 A1 *  7/2018  ........... H04B 7/0695

OTHER PUBLICATIONS

3GPP TS 38.331 V15.8.0 (Dec. 2019), 3rd Generation Partnership Project; Technical Specification Group Radio Access Network; NR;Radio Resource Control (RRC) protocol specification(Release 15),total 532 pages.

3GPP TS 38.214 V16.0.0 (Dec. 2019), 3rd Generation Partnership Project; Technical Specification Group Radio Access Network; NR; Physical layer procedures for data(Release 16),total 147 pages.

International Search Report issued in corresponding International Application No. PCT/CN2020/075764, dated Oct. 29, 2020, pp. 1-10.

International Search Report issued in corresponding International Application No. PCT/CN2020/087320, dated Nov. 9, 2020, pp. 1-10.

3rd Generation Partnership Project; Technical Specification Group Radio Access Network;NR;Physical layer procedures for control(Release 16),3GPP TS 38.213 V16.0.0 (Dec. 2019),total: 146pages.

3rd Generation Partnership Project;Technical Specification Group Radio Access Network;NR;User Equipment (UE) procedures in Idle mode and RRC Inactive state(Release 15),total:30pages.

\* cited by examiner

COMMUNICATION METHOD AND APPARATUS

CROSS-REFERENCE TO RELATED APPLICATIONS

This application is a continuation of International Application No. PCT/CN2020/087320, filed on Apr. 27, 2020, which claims priority to International Application No. PCT/CN2020/075764, filed on Feb. 18, 2020. The disclosures of the aforementioned applications are hereby incorporated by reference in their entireties.

BACKGROUND

After a terminal device is powered on or switches from a connected state to an idle state or an inactive state, the terminal device needs to perform time-frequency tracking and radio resource measurement. Specifically, the terminal device may implement the time-frequency tracking and the radio resource measurement through synchronization signal block (SSB) measurement. However, power consumption is high in a process in which the terminal device performs SSB measurement.

SUMMARY

Embodiments herein describe a communication method and apparatus, to reduce power consumption of a terminal device.

To resolve the foregoing problem, the following technical solutions are used in at least one embodiment:

According to a first aspect, at least one embodiment provides a communication method. The method includes: A network device sends at least one piece of downlink control information (DCI) on a physical downlink control channel (PDCCH) monitoring occasion of a first paging occasion (PO), where all or a part of the at least one piece of DCI includes first indication information, each piece of first indication information indicates that at least one channel state information reference signal (CSI-RS) is available, the at least one CSI-RS corresponds to at least one SSB, and the at least one SSB corresponds to a PDCCH monitoring occasion for sending the DCI including the first indication information. The network device sends the CSI-RS indicated by the first indication information as available.

In the method provided in the first aspect, the network device indicates, by using DCI sent on a PDCCH monitoring occasion corresponding to an SSB, that a CSI-RS corresponding to the SSB is available, and a terminal device determines the available CSI-RS based on the DCI. The terminal device receives the available CSI-RS, so that the terminal device can further measure the CSI-RS, to implement time-frequency tracking and radio resource measurement. Power consumption generated in response to the terminal device performing CSI-RS measurement is less than that generated in response to the terminal device performing SSB measurement. Therefore, the communication method provided in at least one embodiment reduces the power consumption of the terminal device.

In at least one embodiment, before sending the at least one piece of DCI, the network device configures N CSI-RSs for the terminal device by using a system information block (SIB) or higher layer signaling, where the N CSI-RSs include the CSI-RS indicated by the first indication information as available, and N is a positive integer. In this way, the network device configures the N CSI-RSs for the terminal device in an idle state or an inactive state.

In at least one embodiment, the network device configures a correspondence between the N CSI-RSs and M SSBs for the terminal device by using a SIB or higher layer signaling, where the M SSBs are SSBs actually sent by the network device, and M is a positive integer. In this way, the network device configures the correspondence between the N CSI-RSs and the M SSBs for the terminal device in the idle state or the inactive state.

In at least one embodiment, the correspondence between the N CSI-RSs and the M SSBs is related to a sequence of the N CSI-RSs in the SIB or the higher layer signaling for configuring the N CSI-RSs, or is related to identifiers of the N CSI-RSs. In this way, the network device determines the correspondence between the N CSI-RSs and the M SSBs based on the sequence of the N CSI-RSs in the SIB or the higher layer signaling or the identifiers of the N CSI-RSs.

In at least one embodiment, the at least one CSI-RS is in spatial location relationship to the at least one SSB. In this way, the network device indicates that the CSI-RS in spatial location relationship to the SSB is available, so that the terminal device receives and measures the CSI-RS in spatial location relationship to the SSB, to ensure that the CSI-RS measurement achieves a same measurement objective as the SSB measurement.

In at least one embodiment, the at least one CSI-RS is in quasi co-location (QCL)-typeD relationship to the at least one SSB, or a beam direction of the at least one CSI-RS is the same as or similar to a beam direction of the at least one SSB.

In at least one embodiment, one or more terminal devices that receive the DCI on the PDCCH monitoring occasion of the first PO are grouped into L terminal groups, where L is a positive integer. A first bit in each piece of DCI indicates whether the first indication information exists, a second bit indicates whether second indication information exists, and the second indication information indicates a terminal group that receives a physical downlink shared channel (PDSCH) scheduled by using the DCI. In response to the first bit indicating that the first indication information exists, and the second bit indicates that the second indication information exists, the first indication information occupies a third bit and a fourth bit, and the second indication information occupies a fifth bit and a sixth bit. In response to the first bit indicating that the first indication information exists, and the second bit indicates that the second indication information does not exist, the first indication information occupies a third bit, a fourth bit, a fifth bit, and a sixth bit. In response to the first bit indicating that the first indication information does not exist, and the second bit indicates that the second indication information exists, the second indication information occupies a third bit, a fourth bit, a fifth bit, and a sixth bit. In this way, the network device flexibly sets the bits occupied by the first indication information and the second indication information in the DCI, to improve bit utilization in the DCI.

In at least one embodiment, a same PO described in the first aspect is the first PO.

In at least one embodiment, the configuring N CSI-RSs for the terminal device by using a SIB includes: configuring the N CSI-RSs for the terminal device by using K SIBs, where there is a correspondence between the K SIBs and the M SSBs, the M SSBs are the SSBs actually sent by the network device, and K is a positive integer. In this way, the network device configures the corresponding CSI-RSs for the terminal device by using different SIBs.

In at least one embodiment, the network device configures, by using a SIB in the K SIBs that corresponds to a target SSB, a CSI-RS corresponding to the target SSB. In this way, the network device determines a correspondence between a SIB and a CSI-RS based on a correspondence between the SIB and an SSB, and configures, by using a corresponding SIB, a CSI-RS corresponding to the SIB.

In at least one embodiment, the at least one CSI-RS is in a time window, the time window includes one or more slots between the first PO and a second PO, and the second PO follows the first PO in time domain. In this way, the network device further limits, by using the time window, the CSI-RS indicated by the first indication information, so that a quantity of CSI-RSs indicated by the first indication information is further reduced, thereby reducing a quantity of bits occupied by the first indication information.

In at least one embodiment, the time window and the second PO are in a same DRX cycle. In this way, a time interval between the time window and the second PO is small, to reduce light sleep duration of the terminal device between the time window and the second PO.

In at least one embodiment, the time window is in a DRX cycle followed by a DRX cycle to which the second PO belongs. In this way, in response to the second PO being an earlier PO in the DRX cycle, sufficient time-domain positions is reserved for the time window.

In at least one embodiment, the first PO and the second PO are in the same DRX cycle. In this way, a time interval between the first PO and the second PO is short, so that accuracy of indicating the available CSI-RS by the first indication information on the first PO is improved.

In at least one embodiment, the first PO is in a DRX cycle followed by the DRX cycle to which the second PO belongs.

In at least one embodiment, the first PO and the second PO are POs monitored by the terminal device in different DRX cycles. In this way, in response to the first PO being a PO that the terminal device monitors in a previous DRX cycle, the terminal device does not additionally wake up to receive the first indication information.

In at least one embodiment, in response to the time window including a plurality of CSI-RSs, the at least one CSI-RS is all or a part of the CSI-RSs in the time window. In this way, the first indication information indicates the part of the CSI-RSs in the time window, so that the quantity of CSI-RSs that need to be indicated by the first indication information is further reduced, to reduce the quantity of bits that need to be occupied by the first indication information.

In at least one embodiment, a maximum quantity of CSI-RSs in the time window is determined in advance. In this way, in response to the quantity of CSI-RSs in the time window being determined, a fixed quantity of bits is allocated in the DCI to carry the first indication information.

According to a second aspect, at least one embodiment provides a communication method. The method includes: A terminal device receives DCI on a PDCCH monitoring occasion of a PO, where the DCI includes first indication information, the first indication information indicates that at least one CSI-RS is available, the at least one CSI-RS corresponds to at least one SSB, and the at least one SSB corresponds to the PDCCH monitoring occasion. The terminal device receives the CSI-RS indicated by the first indication information as available.

Based on the foregoing technical solution, the terminal device in an idle state or an inactive state determines the available CSI-RS by using the DCI sent by a network device. The terminal device receives the CSI-RS indicated by the first indication information as available, so that the terminal device further measures the CSI-RS, to implement time-frequency tracking and radio resource measurement. Power consumption generated in response to the terminal device performing CSI-RS measurement is less than that generated in response to the terminal device performing SSB measurement. Therefore, the communication method provided in at least one embodiment reduces the power consumption of the terminal device.

In at least one embodiment, before receiving the DCI, the terminal device receives a SIB or higher layer signaling used by the network device to configure N CSI-RSs, where the N CSI-RSs include the CSI-RS indicated by the first indication information as available, and N is a positive integer. In this way, in response to the terminal device being in the idle state or the inactive state, the terminal device determines information about the N CSI-RSs by using the SIB or the higher layer signaling.

In at least one embodiment, the terminal device receives a SIB or higher layer signaling used by the network device to configure a correspondence between the N CSI-RSs and M SSBs, where the M SSBs are SSBs actually sent by the network device, and M is a positive integer. In this way, in response to the terminal device being in the idle state or the inactive state, the terminal device determines the correspondence between the N CSI-RSs and the M SSBs by using the SIB or the higher layer signaling.

In at least one embodiment, the correspondence between the N CSI-RSs and the M SSBs is related to a sequence of the N CSI-RSs in the SIB or the higher layer signaling for configuring the N CSI-RSs, or is related to identifiers of the N CSI-RSs.

In at least one embodiment, the at least one CSI-RS is in spatial location relationship to the at least one SSB. In this way, the terminal device receives and measures the CSI-RS in spatial location relationship to the SSB, to ensure that the CSI-RS measurement performed by the terminal device achieves a same measurement objective as the SSB measurement.

In at least one embodiment, the at least one CSI-RS is in QCL-typeD relationship to the at least one SSB, or a beam direction of the at least one CSI-RS is the same as or similar to a beam direction of the at least one SSB.

In at least one embodiment, one or more terminal devices that receive the DCI on the PDCCH monitoring occasion of the first PO are grouped into L terminal groups, where L is a positive integer. A first bit in each piece of DCI indicates whether the first indication information exists, a second bit indicates whether second indication information exists, and the second indication information indicates a terminal group that receives a physical downlink shared channel PDSCH scheduled by using the DCI. In response to the first bit indicating that the first indication information exists, and the second bit indicates that the second indication information exists, the first indication information occupies a third bit and a fourth bit, and the second indication information occupies a fifth bit and a sixth bit. In response to the first bit indicating that the first indication information exists, and the second bit indicates that the second indication information does not exist, the first indication information occupies a third bit, a fourth bit, a fifth bit, and a sixth bit. In response to the first bit indicating that the first indication information does not exist, and the second bit indicates that the second indication information exists, the second indication information occupies a third bit, a fourth bit, a fifth bit, and a sixth bit.

In at least one embodiment, the N CSI-RSs are configured for the terminal device by using K SIBs, there is a correspondence between the K SIBs and the M SSBs, the M SSBs are the SSBs actually sent by the network device, and K is a positive integer.

In at least one embodiment, a SIB in the K SIBs that corresponds to a target SSB is used to configure a CSI-RS corresponding to the target SSB.

In at least one embodiment, the at least one CSI-RS is in a time window, the time window includes one or more slots between the first PO and a second PO, and the second PO follows the first PO in time domain.

In at least one embodiment, the time window and the second PO are in a same DRX cycle.

In at least one embodiment, the time window is in a DRX cycle followed by a DRX cycle to which the second PO belongs.

In at least one embodiment, the first PO and the second PO are in the same DRX cycle.

In at least one embodiment, the first PO is in a DRX cycle followed by the DRX cycle to which the second PO belongs.

In at least one embodiment, the first PO and the second PO are POs monitored by the terminal device in different DRX cycles.

In at least one embodiment, in response to the time window including a plurality of CSI-RSs, the at least one CSI-RS is all or a part of the CSI-RSs in the time window.

In at least one embodiment, a maximum quantity of CSI-RSs in the time window is determined in advance.

According to a third aspect, at least one embodiment provides a network device. The network device includes a processing unit and a communication unit. The processing unit is configured to send at least one piece of DCI through the communication unit on a PDCCH monitoring occasion belonging to a same PO, where all or a part of the at least one piece of DCI includes first indication information, each piece of first indication information indicates that at least one CSI-RS is available, the at least one CSI-RS corresponds to at least one SSB, and the at least one SSB corresponds to a PDCCH monitoring occasion for sending the DCI including the first indication information. The processing unit is further configured to send, through the communication unit, the CSI-RS indicated by the first indication information as available.

In at least one embodiment, the processing unit is further configured to configure N CSI-RSs for a terminal device by using a SIB or higher layer signaling through the communication unit, where the N CSI-RSs include the CSI-RS indicated by the first indication information as available, and N is a positive integer.

In at least one embodiment, the processing unit is further configured to configure a correspondence between the N CSI-RSs and M SSBs for the terminal device by using a SIB or higher layer signaling through the communication unit, where the M SSBs are SSBs actually sent by the network device, and M is a positive integer.

In at least one embodiment, the correspondence between the N CSI-RSs and the M SSBs is related to a sequence of the N CSI-RSs in the SIB or the higher layer signaling for configuring the N CSI-RSs, or is related to identifiers of the N CSI-RSs.

In at least one embodiment, the at least one CSI-RS is in spatial location relationship to the at least one SSB.

In at least one embodiment, the at least one CSI-RS is in QCL-typeD relationship to the at least one SSB, or a beam direction of the at least one CSI-RS is the same as or similar to a beam direction of the at least one SSB.

In at least one embodiment, one or more terminal devices that receive the DCI on the PDCCH monitoring occasion of the first PO are grouped into L terminal groups, where L is a positive integer. A first bit in each piece of DCI indicates whether the first indication information exists, a second bit indicates whether second indication information exists, and the second indication information indicates a terminal group that receives a physical downlink shared channel PDSCH scheduled by using the DCI. In response to the first bit indicating that the first indication information exists, and the second bit indicates that the second indication information exists, the first indication information occupies a third bit and a fourth bit, and the second indication information occupies a fifth bit and a sixth bit. In response to the first bit indicating that the first indication information exists, and the second bit indicates that the second indication information does not exist, the first indication information occupies a third bit, a fourth bit, a fifth bit, and a sixth bit. In response to the first bit indicating that the first indication information does not exist, and the second bit indicates that the second indication information exists, the second indication information occupies a third bit, a fourth bit, a fifth bit, and a sixth bit.

In at least one embodiment, the processing unit is specifically configured to configure the N CSI-RSs for the terminal device by using K SIBs, where there is a correspondence between the K SIBs and the M SSBs, the M SSBs are the SSBs actually sent by the network device, and K is a positive integer.

In at least one embodiment, the processing unit is specifically configured to configure, by using a SIB in the K SIBs that corresponds to a target SSB, a CSI-RS corresponding to the target SSB.

In at least one embodiment, the at least one CSI-RS is in a time window, the time window includes one or more slots between the first PO and a second PO, and the second PO follows the first PO in time domain.

In at least one embodiment, the time window and the second PO are in a same DRX cycle.

In at least one embodiment, the time window is in a DRX cycle followed by a DRX cycle to which the second PO belongs.

In at least one embodiment, the first PO and the second PO are in the same DRX cycle.

In at least one embodiment, the first PO is in a DRX cycle followed by the DRX cycle to which the second PO belongs.

In at least one embodiment, the first PO and the second PO are POs monitored by the terminal device in different DRX cycles.

In at least one embodiment, in response to the time window including a plurality of CSI-RSs, the at least one CSI-RS is all or a part of the CSI-RSs in the time window.

In at least one embodiment, a maximum quantity of CSI-RSs in the time window is determined in advance.

According to a fourth aspect, at least one embodiment provides a terminal device. The terminal device includes a processing unit and a communication unit. The processing unit is configured to receive DCI on a PDCCH monitoring occasion of a PO through the communication unit, where the DCI includes first indication information, the first indication information indicates that at least one CSI-RS is available, the at least one CSI-RS corresponds to at least one SSB, and the at least one SSB corresponds to the PDCCH monitoring occasion. The processing unit is further configured to receive, through the communication unit, the CSI-RS indicated by the first indication information as available.

In at least one embodiment, the processing unit is further configured to receive, through the communication unit, a SIB or higher layer signaling used by a network device to configure N CSI-RSs, where the N CSI-RSs include the CSI-RS indicated by the first indication information as available, and N is a positive integer.

In at least one embodiment, the processing unit is further configured to receive, through the communication unit, a SIB or higher layer signaling used by the network device to configure a correspondence between the N CSI-RSs and M SSBs, where the M SSBs are SSBs actually sent by the network device, and M is a positive integer.

In at least one embodiment, the correspondence between the N CSI-RSs and the M SSBs is related to a sequence of the N CSI-RSs in the SIB or the higher layer signaling for configuring the N CSI-RSs, or is related to identifiers of the N CSI-RSs.

In at least one embodiment, the at least one CSI-RS is in spatial location relationship to the at least one SSB.

In at least one embodiment, the at least one CSI-RS is in quasi co-location QCL-typeD relationship to the at least one SSB, or a beam direction of the at least one CSI-RS is the same as or similar to a beam direction of the at least one SSB.

In at least one embodiment, one or more terminal devices that receive the DCI on the PDCCH monitoring occasion of the first PO are grouped into L terminal groups, where L is a positive integer. A first bit in each piece of DCI indicates whether the first indication information exists, a second bit indicates whether second indication information exists, and the second indication information indicates a terminal group that receives a physical downlink shared channel PDSCH scheduled by using the DCI. In response to the first bit indicating that the first indication information exists, and the second bit indicates that the second indication information exists, the first indication information occupies a third bit and a fourth bit, and the second indication information occupies a fifth bit and a sixth bit. In response to the first bit indicating that the first indication information exists, and the second bit indicates that the second indication information does not exist, the first indication information occupies a third bit, a fourth bit, a fifth bit, and a sixth bit. In response to the first bit indicating that the first indication information does not exist, and the second bit indicates that the second indication information exists, the second indication information occupies a third bit, a fourth bit, a fifth bit, and a sixth bit.

In at least one embodiment, the N CSI-RSs are configured for the terminal device by using K SIBs, there is a correspondence between the K SIBs and the M SSBs, the M SSBs are the SSBs actually sent by the network device, and K is a positive integer.

In at least one embodiment, a SIB in the K SIBs that corresponds to a target SSB is used to configure a CSI-RS corresponding to the target SSB.

In at least one embodiment, the at least one CSI-RS is in a time window, the time window includes one or more slots between the first PO and a second PO, and the second PO follows the first PO in time domain.

In at least one embodiment, the time window and the second PO are in a same DRX cycle.

In at least one embodiment, the time window is in a DRX cycle followed by a DRX cycle to which the second PO belongs.

In at least one embodiment, the first PO and the second PO are in the same DRX cycle.

In at least one embodiment, the first PO is in a DRX cycle followed by the DRX cycle to which the second PO belongs.

In at least one embodiment, the first PO and the second PO are POs monitored by the terminal device in different DRX cycles.

In at least one embodiment, in response to the time window including a plurality of CSI-RSs, the at least one CSI-RS is all or a part of the CSI-RSs in the time window.

In at least one embodiment, a maximum quantity of CSI-RSs in the time window is determined in advance.

According to a fifth aspect, at least one embodiment provides a communication apparatus, including a processor and a storage medium. The storage medium includes instructions, and the processor is configured to run the instructions, to implement the communication method according to any one of the first aspect or the possible implementations of the first aspect. The communication apparatus is a network device or a chip in the network device.

According to a sixth aspect, at least one embodiment provides a communication apparatus, including a processor and a storage medium. The storage medium includes instructions, and the processor is configured to run the instructions, to implement the communication method according to any one of the second aspect or the possible implementations of the second aspect. The communication apparatus is a terminal device or a chip in the terminal device.

According to a seventh aspect, at least one embodiment provides a computer-readable storage medium. The computer-readable storage medium stores instructions; and in response to the instructions being run on a network device, the network device is enabled to perform the communication method according to any one of the first aspect or the possible implementations of the first aspect.

According to an eighth aspect, at least one embodiment provides a computer-readable storage medium. The computer-readable storage medium stores instructions; and in response to the instructions being run on a terminal device, the terminal device is enabled to perform the communication method according to any one of the second aspect or the possible implementations of the second aspect.

According to a ninth aspect, at least one embodiment provides a computer program product including instructions. In response to the computer program product running on a network device, the network device is enabled to perform the communication method according to any one of the first aspect or the possible implementations of the first aspect.

According to a tenth aspect, at least one embodiment provides a computer program product including instructions. In response to the computer program product running on a terminal device, the terminal device is enabled to perform the communication method according to any one of the second aspect or the possible implementations of the second aspect.

According to an eleventh aspect, at least one embodiment provides a communication system, including a network device and a terminal device that communicates with the network device. The network device is configured to perform the communication method according to any one of the first aspect or the possible implementations of the first aspect, and the terminal device is configured to perform the communication method according to any one of the second aspect or the possible implementations of the second aspect.

Descriptions of technical features, technical solutions, beneficial effects, or similar words in embodiments described herein do not imply that all features and advantages are implemented in any individual embodiment. On the contrary, the descriptions of the features or the beneficial effects mean that at least one embodiment includes a specific technical feature, technical solution, or beneficial effect.

Therefore, the descriptions of the technical features, the technical solutions, or the beneficial effects do not belong to one embodiment. Further, the technical features, the technical solutions, and the beneficial effects described in embodiments are combined in any proper manner. A person skilled in the art understands that an embodiment is implemented without one or more specific technical features, technical solutions, or beneficial effects in a specific embodiment. In other embodiments, additional technical features and beneficial effects is further identified in a specific embodiment that does not reflect all embodiments.

DESCRIPTION OF EMBODIMENTS

In descriptions of at least one embodiment, unless otherwise specified, "I" means "or". For example, A/B represents A or B. A term "and/or" in this specification describes only an association relationship between associated objects and indicates that there are three relationships. For example, A and/or B represents the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

In at least one embodiment, words such as "example" or "for example" are used to represent giving an example, an illustration, or a description. Any embodiment or design scheme described as an "example" or "for example" in at least one embodiment is not explained as being more preferred or having more advantages than another embodiment or design scheme. Exactly, use of the words such as "example" or "for example" is intended to present a relative concept in a specific manner.

Figure 1:
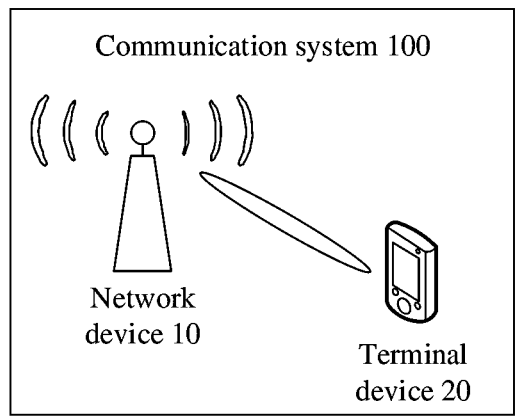
FIG. 1 is a diagram of a system architecture of a communication system according to at least one embodiment.

At least one embodiment applies to a communication system 100 shown in FIG. 1. The communication system 100 includes a network device 10 and a terminal device 20. The network device 10 communicates with the terminal device 20 through a radio link.

A communication system in at least one embodiment includes but is not limited to a long term evolution (LTE) system, a 5th-generation (5G) system, a new radio (NR) system, a wireless local area network (WLAN) system, a future evolved system, or a system converging a plurality of communication technologies. For example, a method provided in at least one embodiment is specifically applied to an evolved universal terrestrial radio access network (E-UTRAN) system and a next generation-radio access network (NG-RAN) system.

A network device in at least one embodiment is a network-side entity configured to send a signal, receive a signal, or send a signal and receive a signal. The network device is an apparatus that is deployed in a radio access network (RAN) and that provides a wireless communication function for a terminal device, for example, is a transmission reception point (TRP), a base station (for example, an evolved NodeB (eNB or eNodeB), a next generation node base station (gNB), or a next generation eNB (ng-eNB)), control nodes in various forms (for example, a network controller or a radio controller (for example, a radio controller in a cloud radio access network (CRAN) scenario)), or a road side unit (RSU). Specifically, the network device is a macro base station, a micro base station (also referred to as a small cell), a relay station, an access point (AP), or the like in various forms, or is an antenna panel of a base station. The control node is connected to a plurality of base stations, and configure resources for a plurality of terminal devices that fall within coverage of the plurality of base stations. In systems using different radio access technologies (RATs), names of devices having a base station function is different. For example, the base station is referred to as an eNB or an eNodeB in the LTE system, and is referred to as a gNB in the 5G system or the NR system. A specific name of the base station is not limited in at least one embodiment. The network device is alternatively a network device in a future evolved public land mobile network (PLMN) or the like.

A terminal device in at least one embodiment is a user-side entity configured to receive a signal, send a signal, or receive a signal and send a signal. The terminal device is configured to provide one or both of a voice service and a data connectivity service for a user. The terminal device is also referred to as user equipment (UE), a terminal, an access terminal, a subscriber unit, a subscriber station, a mobile station, a remote station, a remote terminal, a mobile device, a user terminal, a wireless communication device, a user agent, or a user apparatus. The terminal device is a vehicle-to-everything (V2X) device, for example, a smart car (or intelligent car), a digital car, an unmanned car (or driverless car, pilotless car, or automobile), an autonomous car (or self-driving car), a pure electric vehicle (EV) (or battery EV), a hybrid electric vehicle (HEV), a range extended electric vehicle (REEV), a plug-in hybrid electric vehicle (PHEV), a new energy vehicle, or the like. Alternatively, the terminal device is a device-to-device (D2D) device, for example, an electricity meter or a water meter. Alternatively, the terminal device is a mobile station (MS), a subscriber unit, an unmanned aerial vehicle, an internet of things (IoT) device, a station (ST) in a WLAN, a cellular phone, a smartphone, a cordless phone, a wireless data card, a tablet computer, a session initiation protocol (SIP) phone, a wireless local loop (WLL) station, a personal digital assistant (PDA) device, a laptop computer, a machine type communication (MTC) terminal, a handheld device having a wireless communication function, a computing device or another processing device connected to a wireless modem, a vehicle-mounted device, or a wearable device (which is also referred to as a wearable intelligent device). The terminal device is alternatively a terminal device in a next-generation communication system, for example, a terminal device in the 5G system, a terminal device in the future evolved PLMN, or a terminal device in the NR system.

For clarity, some concepts in embodiments are first briefly described.

1. Idle State

The idle state is a state of a terminal device that has camped in a cell but has not performed a random access procedure. The terminal device usually enters the idle state after the terminal device is powered on or after releases an RRC connection.

2. Connected State

The connected state is a state of a terminal device that has not released an RRC connection after completing a random access procedure. The terminal device in the connected state performs data transmission with a network device.

In response to the terminal device being in the idle state, after completing the random access procedure, the terminal device switches to the connected state. In response to the terminal device being in the connected state, after completing releasing the RRC connection, the terminal device switches to the idle state.

3. Inactive State

The inactive state is a state between the connected state and the idle state.

For a terminal device in the inactive state, a user plane bearer of an air interface is suspended, and a user plane bearer and a control plane bearer between a radio access network (RAN) and a core network (CN) are still maintained. In response to the terminal device indicating a call or service request, the user plane bearer of the air interface is activated, and the existing user plane bearer and the existing control plane bearer between the RAN and the CN are reused.

4. CSI-RS

The CSI-RS is used to evaluate beam quality. A beam corresponds to a CSI-RS resource. Therefore, a terminal device determines quality of the CSI-RS resource by measuring and evaluating the CSI-RS resource. The terminal device reports, to a network device, the quality that is of the CSI-RS resource and that is obtained through measurement and evaluation, so that the network device determines the beam quality based on the quality of the CSI-RS resource and a correspondence between the beam and the CSI-RS resource.

To determine the beam quality, the network device sends measurement configuration information to the terminal device. The measurement configuration information mainly includes two parts: resource configuration information and report configuration information.

The resource configuration information is information related to a resource to be measured, and is configured by using a three-level structure (resource configuration (resourceConfig)-resource set (resourceSet)-resource) in a protocol. The network device configures one or more resource configurations for the terminal device. Each resource configuration includes one or more resource sets, and each resource set includes one or more resources. Each resource configuration/resource set/resource includes an index of the resource configuration/resource set/resource. In addition, some other parameters are further included, for example, a resource periodicity and a signal type corresponding to the resource.

5. Discontinuous Reception (DRX) Mode

The DRX mode is a mode in which a terminal device receives a signal, and is intended to reduce power consumption of the terminal device. The terminal device determines, based on a configuration of a network device, whether to receive the signal in the DRX mode. In response to the terminal device receiving the signal in the DRX mode, in active time of a DRX cycle, the terminal device receives a CSI-RS, and perform channel state information (CSI) measurement. Beyond the active time, the terminal device enters sleep time. The terminal device neither receives a CSI-RS nor performs CSI measurement in the sleep time.

6. Paging Message

The paging message is used to trigger a terminal device to establish an RRC connection or notify the terminal device of a system information update, or is used for another purpose. Content in the paging message is sent to the terminal device through a physical downlink shared channel (PDSCH), and the PDSCH is scheduled by using a PDCCH scrambled by using a paging radio network temporary identifier (P-RNTI).

A process in which the terminal device obtains the paging message is as follows: The terminal device in the idle state or the inactive state periodically wakes up. After the terminal device wakes up, the terminal device monitors the PDCCH scrambled by using the P-RNTI, and parses DCI in the PDCCH to determine position (for example, time-frequency position) information of the PDSCH. The terminal device receives the PDSCH based on the position information of the PDSCH, and obtains the paging message on the PDSCH. The terminal device determines whether a pagingrecordList in the paging message includes a terminal device identifier of the terminal device. In response to the pagingrecordList including the terminal device identifier of the terminal device, the terminal device performs a corresponding operation (for example, establishes an RRC connection or falls back from the inactive state to the idle state).

7. PO

In at least one embodiment, the PO is a set of one or more PDCCH monitoring occasions. One PO includes one or more slots. A network device sends a PDCCH in the slot included in the PO.

A terminal device in the idle state or the inactive state monitors, in each DRX cycle, a PDCCH sent by the network device on one PO.

8. Beam

The beam is a communication resource. The beam is a wide beam, a narrow beam, or a beam of another type. A technology for forming the beam is a beamforming technology or another technical means. The beamforming technology is specifically a digital beamforming technology, an analog beamforming technology, or a hybrid digital/analog beamforming technology. Different beams is considered as different resources. Same information or different information is sent by using different beams. Optionally, a plurality of beams having a same communication feature or similar communication features is considered as one beam. One beam includes one or more antenna ports for transmitting a data channel, a control channel, a sounding signal, and the like. For example, a transmit beam is distribution of signal strength formed in different spatial directions after a signal is sent through an antenna, and a receive beam is distribution of signal strength in different spatial directions that is of a radio signal received from the antenna. It is understood that, one or more antenna ports forming one beam is also considered as one antenna port set.

Beams is classified into a transmit beam and a receive beam of a network device and a transmit beam and a receive beam of a terminal device. The transmit beam of the network device is used to describe transmit-side beamforming information of the network device, and the receive beam of the network device is used to describe receive-side beamforming information of the network device. The transmit beam of the terminal device is used to describe transmit-side beamforming information of the terminal device, and the receive beam of the terminal device is used to describe receive-side beamforming information of the terminal device. In other words, the beam is used to describe beamforming information.

The beam corresponds to one or more of a time-domain resource, a space-domain resource, and a frequency-domain resource.

Optionally, the beam further corresponds to a reference signal resource (for example, a reference signal resource for beamforming) or the beamforming information.

Optionally, the beam further corresponds to information associated with a reference signal resource of the network device. A reference signal is a CSI-RS, an SSB, a demodulation reference signal (DMRS), a phase tracking reference signal (PTRS), a tracking reference signal (TRS), or the like. The information associated with the reference signal resource is an identifier of the reference signal resource, QCL information (especially QCL-typeD), or the like. The identifier of the reference signal resource corresponds to a transmit-receive beam pair that is previously established during measurement performed based on the reference signal resource. The terminal device infers beam information based on the identifier of the reference signal resource.

Optionally, the beam further corresponds to a spatial filter (spatial domain filter) or a spatial domain transmission filter.
9. QCL QCL information indicates a QCL relationship between two types of reference signals. A target reference signal is usually a DMRS, a CSI-RS, or the like. A source reference signal is usually a CSI-RS, a TRS, an SSB, or the like. Spatial characteristic parameters of two reference signals or channels that satisfy a QCL relationship are the same, so that a spatial characteristic parameter of the target reference signal is deduced based on a resource index of the source reference signal. The spatial characteristic parameter includes one or more of the following parameters:

an angle of arrival (AoA), a dominant AoA, an average AoA, a power angular spectrum (PAS) of the AoA, an angle of departure (AoD), a dominant AoD, an average AoD, a power angular spectrum of the AoD, terminal device transmit beamforming, terminal device receive beamforming, spatial channel correlation, base station transmit beamforming, base station receive beamforming, an average channel gain, an average channel delay (or average delay), delay spread, Doppler spread, a Doppler shift, a spatial reception parameter (spatial Rx parameter), and the like.

These spatial characteristic parameters describe a characteristic of a spatial channel between an antenna port for the source reference signal and an antenna port for the target reference signal, and help a terminal device complete receive-side beamforming or a receive-side processing process based on the QCL information. The terminal device receives the target reference signal based on receive beam information that is of the source reference signal and that is indicated by the QCL information.

To reduce overheads of indicating the QCL information by a network device side to a terminal device side, in an optional implementation, the network device side indicates that a DMRS of a PDCCH or a PDSCH satisfies the QCL relationship to one or more of a plurality of reference signal resources previously reported by the terminal device. For example, a reference signal is a CSI-RS. Herein, an index of each reported CSI-RS resource corresponds to one transmit-receive beam pair that is previously established during measurement performed based on the CSI-RS resource. Receive beam information of two reference signals or channels satisfying the QCL relationship is the same. Therefore, based on an index of the reference signal resource, the terminal device infers receive beam information for receiving the PDCCH or the PDSCH.

Four types of QCL are defined in an existing standard. A network device configures one or more types of QCL for the terminal device. The four types of QCL are:

"QCL-typeA": {Doppler shift, Doppler spread, average delay, delay spread};
"QCL-typeB": {Doppler shift, Doppler spread};
"QCL-typeC": {Doppler shift, average delay}; and
"QCL-typeD": { spatial reception parameter}.

The "QCL-typeD" describes the fact that beams of two reference signals satisfying the QCL relationship are similar, and some channel parameters of the two reference signals are similar or the same.
10. SSB The SSB includes at least one of a primary synchronization signal (PSS), a secondary synchronization signal (SSS), and a physical broadcast channel (PBCH). The SSB is used for time-frequency tracking, radio resource measurement, and the like.

In a conventional technology, a terminal device in the idle state or the inactive state measures an SSB, to implement time-frequency tracking and radio resource measurement. However, because SSBs sent by a network device are sparsely distributed in space, the terminal device measures the SSB for a plurality of times to complete SSB measurement. Consequently, high power consumption is generated in response to the terminal device in the idle state or the inactive state performing SSB measurement.

Based on this, at least one embodiment provides a method for performing CSI-RS measurement by a terminal device in an idle state or an inactive state to implement time-frequency tracking and radio resource measurement. A spatial distribution density of CSI-RSs sent by a network device is usually greater than that of SSBs. Therefore, the terminal device achieves a same objective (namely, the time-frequency tracking and the radio resource measurement) as the terminal device achieves through SSB measurement without measuring the CSI-RS for a plurality of times, so that power consumption generated in response to the terminal device performing CSI-RS measurement is less than that generated in response to the terminal device performing SSB measurement.

There are many reasons for high power consumption of performing SSB measurement by the terminal device in the idle state or the inactive state. In addition to the foregoing reason that a quantity of SSBs is small and the SSBs are sparsely distributed in space, there are further other reasons such as a long periodicity for performing beam measurement by the terminal device by using the SSB. Details are not described herein.

To resolve the problem, in the conventional technology, that high power consumption is generated in response to the terminal device in the idle state or the inactive state performing SSB measurement, at least one embodiment provides a communication method in which a network device indicates, to a terminal device by using DCI on a PDCCH, an available CSI-RS corresponding to an SSB. After determining the available CSI-RS, the terminal device receives the available CSI-RS, and measure the CSI-RS, to implement the time-frequency tracking and the radio resource measurement. The power consumption generated in response to the terminal device performing CSI-RS measurement is less than that generated in response to the terminal device performing SSB measurement. Therefore, compared with performing time-frequency tracking and radio resource measurement by using the SSB, performing time-frequency tracking and radio resource measurement by using the CSI-RS reduces the power consumption of the terminal device.

Figure 2:
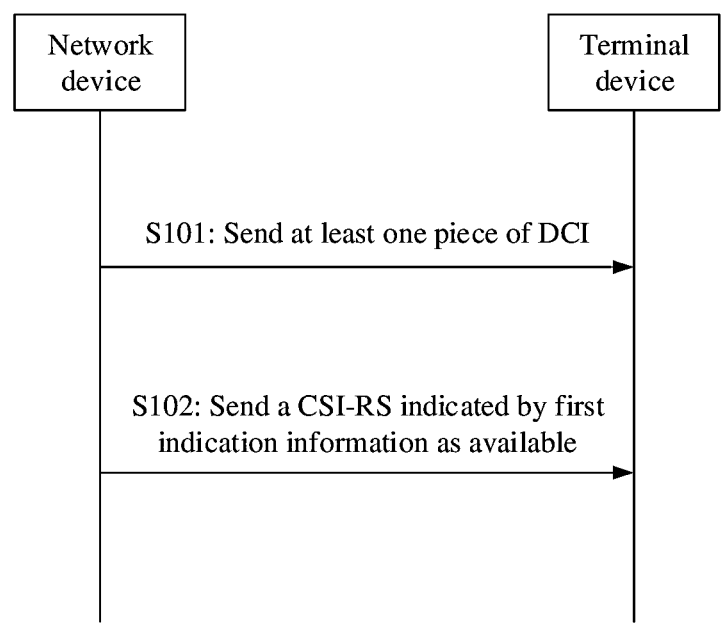
FIG. 2 is a schematic flowchart of a communication method according to at least one embodiment.

At least one embodiment provides a communication method. As shown in FIG. 2, the method includes the following steps.

S101: A network device sends at least one piece of DCI on a PDCCH monitoring occasion belonging to a same PO. Correspondingly, a terminal device receives DCI on a PDCCH monitoring occasion of the PO. The DCI received by the terminal device is DCI in the at least one piece of DCI sent by the network device.

All or a part of the at least one piece of DCI includes first indication information, each piece of first indication information indicates that at least one CSI-RS is available, the at least one CSI-RS corresponds to at least one SSB, and the at least one SSB corresponds to a PDCCH monitoring occasion for sending the DCI including the first indication information.

One PDCCH monitoring occasion is used to send one PDCCH, and one PDCCH includes one piece of DCI.

In an implementation, the PO includes L PDCCH monitoring occasions. There is a correspondence between the L PDCCH monitoring occasions and M SSBs. For example, one SSB corresponds to one or more PDCCH monitoring occasions, and one PDCCH monitoring occasion also corresponds to one or more SSBs. The M SSBs are SSBs actually sent by the network device. L and M are positive integers. That a PDCCH monitoring occasion corresponds to an SSB is also understood as that DCI sent on the PDCCH monitoring occasion corresponds to the SSB.

The network device sends the corresponding DCI on each PDCCH monitoring occasion. In this way, there is also a correspondence between DCI sent by the network device on a PDCCH monitoring occasion and an SSB. Similarly, one SSB corresponds to one or more pieces of DCI, and one piece of DCI also corresponds to one or more SSBs.

In response to one SSB corresponding to a plurality of pieces of DCI, all or a part of the plurality of pieces of DCI include first indication information.

In response to one piece of DCI corresponding to a plurality of SSBs, first indication information included in the DCI indicates whether a CSI-RS corresponding to one or more of the plurality of SSBs is available. That a CSI-RS is available means that the CSI-RS sent by the network device is received and measured by the terminal device.

For example, SSBs correspond one-to-one to PDCCH monitoring occasions. In response to the network device sending four SSBs, namely, an SSB #0, an SSB #1, an SSB #2, and an SSB #3, one PO includes four PDCCH monitoring occasions. The network device sends one piece of DCI on each monitoring occasion. For example, the network device sends DCI-1 on the PDCCH monitoring occasion corresponding to the SSB #0, sends DCI-2 on the PDCCH monitoring occasion corresponding to the SSB #1, sends DCI-3 on the PDCCH monitoring occasion corresponding to the SSB #2, and sends DCI-4 on the PDCCH monitoring occasion corresponding to the SSB #3.

In this case, first indication information included in the DCI-1 indicates whether a CSI-RS corresponding to the SSB #0 is available, first indication information included in the DCI-2 indicates whether a CSI-RS corresponding to the SSB #1 is available, first indication information included in the DCI-3 indicates whether a CSI-RS corresponding to the SSB #2 is available, and first indication information included in the DCI-4 indicates whether a CSI-RS corresponding to the SSB #3 is available.

In this way, the network device indicates, in each piece of DCI, whether a CSI-RS corresponding to an SSB corresponding to the DCI is available, and does not need to indicate, in each piece of DCI, whether all CSI-RSs are available. Therefore, bit overheads of the DCI are reduced.

S102: The network device sends the CSI-RS indicated by the first indication information as available. Correspondingly, the terminal device receives the CSI-RS.

In at least one embodiment, the CSI-RS sent by the network device that is indicated by the first indication information as available is a CSI-RS configured by the network device for another terminal device currently being in a connected state. The network device indicates, by using the first indication information, the terminal device in an idle state or an inactive state to receive and measure the CSI-RS. In this way, the network device does not need to reconfigure a CSI-RS for the terminal device in the idle state or the inactive state. Therefore, network resources of the network device are saved.

After the terminal device receives the CSI-RS indicated by the first indication information as available, the terminal device measures the CSI-RS, to implement time-frequency tracking and radio resource measurement.

In the foregoing technical solution, the network device indicates, by using DCI sent on a PDCCH monitoring occasion corresponding to an SSB, an available CSI-RS corresponding to the SSB. The terminal device determines and receives the available CSI-RS based on the DCI, and measures the CSI-RS, to implement the time-frequency tracking and the radio resource measurement. Power consumption generated in response to the terminal device performing CSI-RS measurement is less than that generated in response to the terminal device performing SSB measurement. Therefore, the communication method provided in at least one embodiment reduces the power consumption of the terminal device.

Figure 3:
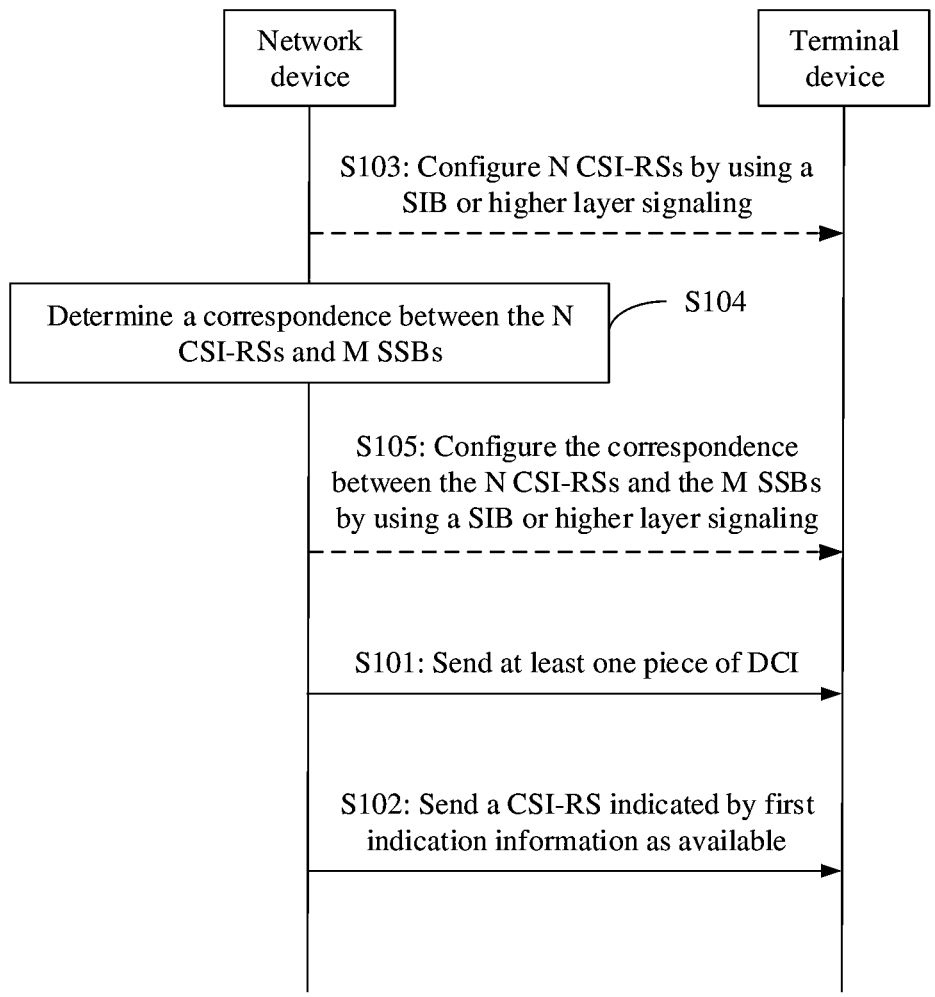
FIG. 3 is a schematic flowchart of another communication method according to at least one embodiment.

Based on the technical solution shown in FIG. 2, optionally, in response to the network device sending N (where N is a positive integer) CSI-RSs, to enable the terminal device to obtain information about the N CSI-RSs, as shown in FIG. 3, before S101, the method further includes the following step:

S103: The network device configures the N CSI-RSs for the terminal device by using a SIB or higher layer signaling. Correspondingly, the terminal device receives the SIB or the higher layer signaling used by the network device to configure the N CSI-RSs, where N is a positive integer.

The N CSI-RSs include the CSI-RS indicated by the first indication information as available.

Based on the technical solution shown in FIG. 2, optionally, to enable the terminal device to obtain a correspondence between the N CSI-RSs and the M SSBs, as shown in FIG. 3, before S101, the method further includes the following steps.

S104: The network device determines the correspondence between the N CSI-RSs and the M SSBs, where M is a positive integer.

The M SSBs are the SSBs actually sent by the network device. The SSB corresponding to any PDCCH monitoring occasion in the foregoing embodiment belongs to the M SSBs.

One CSI-RS corresponds to one or more SSBs, and one SSB corresponds to one or more CSI-RSs.

S105: The network device configures the correspondence between the N CSI-RSs and the M SSBs for the terminal device by using a SIB or higher layer signaling. Correspondingly, the terminal device receives the SIB or the higher layer signaling used by the network device to configure the correspondence between the N CSI-RSs and the M SSBs.

Optionally, in S105, the correspondence between the N CSI-RSs and the M SSBs is in the following two cases: Case 1: group-based correspondence. Case 2: spatial location relationship-based correspondence. The following separately describes the case 1 and the case 2.

Case 1: Group-Based Correspondence

In the case 1, a process in which the network device determines the correspondence between the N CSI-RSs and the M SSBs includes the following step I to step III.

I: The network device determines the quantity M of SSBs and the quantity N of CSI-RSs.

For example, in response to the network device determining that a quantity of actually sent SSBs is 4, the network device determines that the quantity M of SSBs is equal to 4. In response to the network device determining that eight CSI-RSs are actually configured, the network device determines that the quantity N of CSI-RSs is equal to 8.

II: The network device groups the N CSI-RSs into M CSI-RS groups.

The M CSI-RS groups correspond one-to-one to the M SSBs. Quantities of CSI-RSs in the CSI-RS groups is the same or is different. This is not limited in embodiments described herein.

For one CSI-RS in the N CSI-RSs, the CSI-RS belongs to one or more CSI-RS groups. In response to the CSI-RS belonging to one CSI-RS group, the CSI-RS corresponds to one SSB. In response to the CSI-RS belonging to a plurality of CSI-RS groups, the CSI-RS corresponds to a plurality of SSBs.

For any SSB in the M SSBs, a CSI-RS group corresponding to the SSB includes one or more CSI-RSs. In response to the CSI-RS group corresponding to the SSB including one CSI-RS, the SSB corresponds to one CSI-RS. In response to the CSI-RS group corresponding to the SSB including a plurality of CSI-RSs, the SSB corresponds to the plurality of CSI-RSs.

III: The network device determines a CSI-RS group corresponding to each of the M SSBs.

The correspondence between the N CSI-RSs and the M SSBs is related to a sequence of the N CSI-RSs in the SIB or the higher layer signaling for configuring the N CSI-RSs, or is related to identifiers of the N CSI-RSs.

Therefore, in a process in which the network device groups the N CSI-RSs into the M CSI-RS groups, the network device groups the N CSI-RSs based on the sequence of the N CSI-RSs in the SIB or the higher layer signaling for configuring the N CSI-RSs (where this grouping manner is denoted as a grouping manner a), or the network device groups the N CSI-RSs based on the identifiers of the N CSI-RSs (where this grouping manner is denoted as a grouping manner b). The following separately describes the two grouping manners.

In the grouping manner a, the network device groups the CSI-RSs based on the sequence of the CSI-RSs.

The sequence of the CSI-RSs includes any one of a sequence of bits occupied by the CSI-RSs in signaling, a sequence of the CSI-RSs in time domain, a sequence of the CSI-RSs in frequency domain, or a sequence of configuring the CSI-RSs by the network device. This is not limited in embodiments described herein.

For example, the network device actually configures eight CSI-RSs. The eight CSI-RSs are a CSI-RS 1, a CSI-RS 2, a CSI-RS 3, a CSI-RS 4, a CSI-RS 5, a CSI-RS 6, a CSI-RS 7, and a CSI-RS 8. The network device sorts the eight CSI-RSs based on a sequence of bits occupied by the eight CSI-RSs in the signaling. After the sorting, the network device groups the eight CSI-RSs from front to back in a pairwise manner. Specifically, the network device determines that a CSI-RS group 1 includes the CSI-RS 1 and the CSI-RS 2, a CSI-RS group 2 includes the CSI-RS 3 and the CSI-RS 4, a CSI-RS group 3 includes the CSI-RS 5 and the CSI-RS 6, and a CSI-RS group 4 includes the CSI-RS 7 and the CSI-RS 8.

In the grouping manner b, the network device groups the CSI-RSs based on the identifiers of the CSI-RSs.

The identifiers of the CSI-RSs is configured for the CSI-RSs in response to the network device configuring the CSI-RSs.

For example, the network device actually configures eight CSI-RSs. Identifiers of the eight CSI-RSs are an identifier 1, an identifier 2, an identifier 3, an identifier 4, an identifier 5, an identifier 6, an identifier 7, and an identifier 8. The network device groups the eight CSI-RSs based on the eight identifiers in a pairwise manner. For example, the network device determines that a CSI-RS group 1 includes the CSI-RSs corresponding to the identifier 1 and the identifier 2, a CSI-RS group 2 includes the CSI-RSs corresponding to the identifier 3 and the identifier 4, a CSI-RS group 3 includes the CSI-RSs corresponding to the identifier 5 and the identifier 6, and a CSI-RS group 4 includes the CSI-RSs corresponding to the identifier 7 and the identifier 8.

In at least one embodiment, the network device may alternatively group the CSI-RSs in another manner. This is not limited in embodients described herein.

In response to the network device grouping the CSI-RSs, the CSI-RSs is CSI-RSs configured by the network device, or is CSI-RS sets configured by the network device. In response to the CSI-RSs being the CSI-RS sets configured by the network device, a method for grouping the CSI-RS sets by the network device is similar to the method for grouping the CSI-RSs. Details are not described again.

After determining the CSI-RS groups in the grouping manner a or the grouping manner b, the network device determines the SSB corresponding to each CSI-RS group. For example, the network device actually sends four SSBs, namely, an SSB #0, an SSB #1, an SSB #2, and an SSB #3. In this case, the network device determines that the CSI-RS group 1 corresponds to the SSB #0, the CSI-RS group 2 corresponds to the SSB #1, the CSI-RS group 3 corresponds to the SSB #2, and the CSI-RS group 4 corresponds to the SSB #3.

Case 2: Spatial Location Relationship-Based Correspondence

In at least one embodiment, the at least one CSI-RS is in spatial location relationship to the at least one SSB. For example, the at least one CSI-RS is in QCL-typeD relationship to the at least one SSB, or a beam direction of the at least one CSI-RS is the same as or similar to a beam direction of the at least one SSB.

For the CSI-RS and the SSB satisfying the QCL-typeD relationship, because "QCL-typeD" describes the fact that beams of two reference signals satisfying a QCL relationship are similar, and some channel parameters of the two reference signals are similar or the same, the network device considers that the CSI-RS in QCL-typeD relationship to the SSB corresponds to the SSB.

For the SSB and the CSI-RS whose beam directions are the same or similar, in response to the network device sending the SSB, the network device first determines the beam direction of each SSB, and sends the SSB based on the beam direction of each SSB, so that the SSB sent by the network device covers an area as large as possible. Similarly, in response to the network device sending the CSI-RS, the network device first determines the beam direction of each CSI-RS. The network device sends each CSI-RS based on the beam direction of the CSI-RS.

In this way, the network device determines the correspondence between the SSBs and the CSI-RSs based on the beam direction of the SSB and the beam direction of the CSI-RS. For example, the network device determines, as a CSI-RS corresponding to an SSB, a CSI-RS whose beam direction is the same as a beam direction of the SSB or whose beam direction similarity with a beam direction of the SSB is greater than a preset value.

In at least one embodiment, the terminal device determines the correspondence between the PDCCH monitoring occasions and the SSBs by using the following step 1 to step 3. The following specifically describes step 1 to step 3.

1: The network device and the terminal device determines a number of each PDCCH monitoring occasion based on a time-domain position corresponding to each of the L PDCCH monitoring occasions in the PO.

The PDCCH monitoring occasions in the PO correspond to different time-domain positions. The network device and the terminal device determines the number of each PDCCH monitoring occasion based on a sequence of the time-domain positions corresponding to the PDCCH monitoring occasions in the PO.

For example, the network device and the terminal device determines that a number of a PDCCH monitoring occasion corresponding to the first time-domain position in the PO is a number 1, a number of a PDCCH monitoring occasion corresponding to the second time-domain position in the PO is a number 2, and a number of a PDCCH monitoring occasion corresponding to the third time-domain position in the PO is a number 3.

The numbers of the PDCCH monitoring occasions are merely used to distinguish between different PDCCH monitoring occasions. The network device and the terminal device alternatively distinguishes between the different PDCCH monitoring occasions in another manner. This is not limited in embodiments described herein.

2: The network device and the terminal device determine numbers of the SSBs.

In an implementation, the network device and the terminal device determine that the numbers of the SSBs are indexes of the SSBs.

For example, the numbers, of the SSBs, that are determined by the network device and the terminal device are a number 0, a number 1, and a number 2.

3: The network device and the terminal device determine the correspondence between the SSBs and the PDCCH monitoring occasions based on the numbers of the PDCCH monitoring occasions and the numbers of the SSBs.

In an example, the network device and the terminal device sequentially map the numbers of the PDCCH monitoring occasions to the numbers of the SSBs, to determine the correspondence between the SSBs and the PDCCH monitoring occasions.

For example, the PDCCH monitoring occasion with the number 1 corresponds to an SSB #0 (namely, an SSB with the number 0), the PDCCH monitoring occasion with the number 2 corresponds to an SSB #1 (namely, an SSB with the number 1), and the PDCCH monitoring occasion with the number 3 corresponds to an SSB #2 (namely, an SSB with the number 2).

In at least one embodiment, the correspondence between the PDCCH monitoring occasions and the SSBs is: The PDCCH monitoring occasions correspond one-to-one to the SSBs, one PDCCH monitoring occasion corresponds to a plurality of SSBs, or one SSB corresponds to a plurality of PDCCH monitoring occasions. The correspondence between the PDCCH monitoring occasions and the SSBs is related to a search space identifier configured by the network device for a paging search space and a mode of a mapping relationship between an SSB and a control resource set (CORESET) 0. The following provides descriptions in cases.

Case 1: The search space identifier configured by the network device for the paging search space is not 0.

In response to the search space identifier configured by the network device for the paging search space not being 0, the network device configures L PDCCHs on one PO, where there is a correspondence between the L PDCCHs and the M SSBs, and M is equal to L.

A $K^{th}$ PDCCH monitoring occasion in the L PDCCH monitoring occasions corresponds to a $K^{th}$ SSB in the M SSBs. The M SSBs correspond one-to-one to the L PDCCH monitoring occasions.

Figure 4:
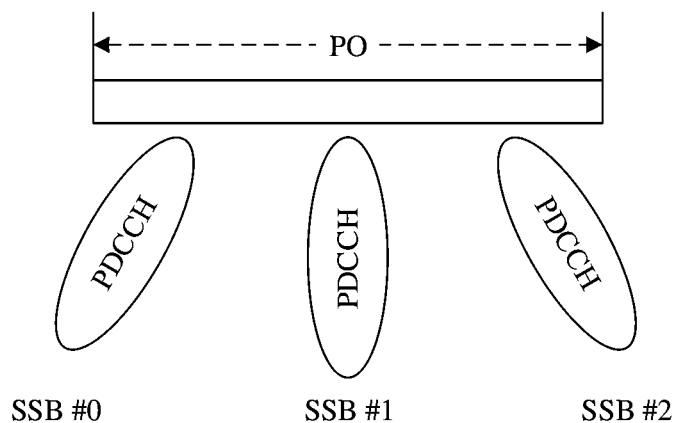
FIG. 4 is a schematic diagram of a correspondence between PDCCH monitoring occasions in one PO and SSBs according to at least one embodiment.

For example, as shown in FIG. 4, the network device actually sends three SSBs, namely, an SSB #0, an SSB #1, and an SSB #2. In this case, one PO includes three PDCCH monitoring occasions, denoted as a PDCCH-1, a PDCCH-2, and a PDCCH-3. In other words, one PO is a set of three PDCCH monitoring occasions.

The PDCCH-1 corresponds to the SSB #0, the PDCCH-2 corresponds to the SSB #1, and the PDCCH-3 corresponds to the SSB #2.

Case 2: The search space identifier configured by the network device for the paging search space is 0, and the mode of the mapping relationship between an SSB and a CORESET 0 is a first mode (which is also referred to as a mode 1).

In response to the search space identifier configured by the network device for the paging search space being 0, and the mode of the mapping relationship between an SSB and a CORESET 0 is the first mode, one SSB corresponds to one or more paging search spaces. In response to one SSB corresponding to a plurality of paging search spaces, the network device configures a PDCCH monitoring occasion in each of the plurality of paging search spaces, and the PDCCH monitoring occasions configured by the network device in the plurality of paging search spaces is the same or is different. In this case, one SSB corresponds to one or more PDCCH monitoring occasions.

Similarly, paging search spaces corresponding to a plurality of different SSBs overlap (that is, the plurality of different SSBs correspond to a same paging search space). In this case, a PDCCH monitoring occasion in the same paging search space corresponds to the plurality of SSBs.

Therefore, in response to the paging search space identifier being 0, and the mode of the mapping relationship between an SSB and a CORESET 0 is the first mode, one SSB corresponds to one or more PDCCH monitoring occasions, and one PDCCH monitoring occasion corresponds to one or more SSBs. The correspondence between the SSBs and the PDCCH monitoring occasions are determined based on a quantity of paging search spaces corresponding to each SSB, a PDCCH monitoring occasion configured by the network device in each paging search space, and an overlapping relationship between the paging search spaces.

For example, in the case 2, the network device actually sends three SSBs, namely, an SSB #0, an SSB #1, and an SSB #2, and each SSB corresponds to two paging search spaces. The SSB #0 corresponds to a paging search space 1 and a paging search space 2, the SSB #1 corresponds to the paging search space 2 and a paging search space 3, and the SSB #2 corresponds to the paging search space 3 and a paging search space 4. A PDCCH monitoring occasion configured by the network device in the paging search space 1 is a PDCCH-1, a PDCCH monitoring occasion configured by the network device in the paging search space 2 is also the PDCCH-1, a PDCCH monitoring occasion configured by the network device in the paging search space 3 is a PDCCH-2, and a PDCCH monitoring occasion configured by the network device in the paging search space 4 is a PDCCH-3.

In this case, the network device determines that a PDCCH monitoring occasion corresponding to the SSB #0 is the PDCCH-1 (namely, the PDCCH monitoring occasion configured by the network device in the paging search space 1 and the paging search space 2), PDCCH monitoring occasions corresponding to the SSB #1 are the PDCCH-1 and the PDCCH-2 (namely, the PDCCH monitoring occasions configured by the network device in the paging search space 2 and the paging search space 3), and PDCCH monitoring occasions corresponding to the SSB #2 are the PDCCH-2 and the PDCCH-3 (namely, the PDCCH monitoring occasions configured by the network device in the paging search space 3 and the paging search space 4).

Correspondingly, the network device determines that SSBs corresponding to the PDCCH-1 are the SSB #0 and the SSB #1. The network device determines that SSBs corresponding to the PDCCH-2 are the SSB #1 and the SSB #2. The network device determines that an SSB corresponding to the PDCCH-3 is the SSB #2.

Correspondingly, first indication information on the PDCCH-1 indicates whether CSI-RSs corresponding to the SSB #0 and the SSB #1 are available. First indication information on the PDCCH-2 indicates whether CSI-RSs corresponding to the SSB #1 and the SSB #2 are available. First indication information on the PDCCH-3 indicates whether the CSI-RS corresponding to the SSB #2 is available.

Case 3: The search space identifier configured by the network device for the paging search space is 0, and the mode of the mapping relationship between an SSB and a CORESET 0 is not a first mode.

In this case, the correspondence between the SSBs and the PDCCH monitoring occasions that is determined by the network device on one PO is the same as that in the case 1. Details are not described herein again.

Based on the foregoing technical solution, both the network device and the terminal device determines the correspondence between the PDCCH monitoring occasions and the SSBs in different cases, to improve applicability of this embodiment.

Optionally, in at least one embodiment, the DCI generated by the network device further includes at least one of second indication information, third indication information, and fourth indication information in addition to the first indication information.

Second indication information in DCI indicates a terminal group that receives a PDSCH scheduled by using the DCI.

Third indication information in DCI indicates whether first indication information exists.

Fourth indication information in DCI indicates whether second indication information exists.

Because the network device cannot sense the terminal device in the idle state or the inactive state, the network device sends a paging message in a broadcast manner. Terminal devices on one PO need to receive DCI on a PDCCH, and obtain a PDSCH scheduled by using the DCI. The terminal devices obtain the paging message on the PDSCH. A pagingrecordList in the paging message indicates a terminal device that receives the paging message. For a terminal device other than the terminal device indicated by an identifier in the pagingrecordList, receiving the paging message on the PDSCH is unnecessary due to unnecessary power consumption of the terminal device.

Therefore, the network device groups the terminal devices on one PO, and add second indication information to the DCI on the PO, to indicate, by using the second indication information, a terminal group that receives the PDSCH scheduled by using the DCI. A terminal device in another terminal group does not need to receive the PDSCH. Therefore, power consumption of the terminal device in the another terminal group is reduced.

The network device uses a reserved bit in the DCI to carry the indication information. In response to the indication information carried in the DCI varying, the bit for carrying the indication information in the DCI varies. The following separately provides descriptions.

I. The DCI carries only the first indication information.

In response to the DCI carrying only the first indication information, the first indication information occupies one or more bits in the DCI. The one or more bits is all or a part of reserved bits in the DCI.

In at least one embodiment, the one or more bits is one or more fixed bits. For example, in response to the DCI including six reserved bits, the one or more bits is the first three bits in the six reserved bits, and the other three bits are still reserved bits.

In another possible implementation, the one or more bits alternatively are one or more bits determined by the network device based on a quantity of CSI-RSs indicated by the first indication information. For example, in response to the DCI including six reserved bits, in response to the network device determining that the first indication information indicates two CSI-RSs, the network device determines that the first indication information occupies the first two bits in the six reserved bits, and the other four bits are still reserved bits. In response to the network device determining that the first indication information indicates four CSI-RSs, the network device determines that the first indication information occupies the first four bits in the six reserved bits, and the other two bits are still reserved bits. In response to the quantity of CSI-RSs indicated by the first indication information being greater than or equal to 6, the network device determines that the first indication information occupies the six reserved bits.

II. The DCI carries the first indication information and the third indication information.

In this case, the third indication information indicates that the first indication information exists.

The first indication information occupies one or more bits in the DCI, and the third indication information occupies one or more bits in the DCI. The first indication information and the third indication information occupy different bits.

the bits occupied by the first indication information and the third indication information is fixed bits in the DCI. For example, in response to the DCI including six reserved bits, the network device determines that the third indication information occupies the $1^{st}$ bit in the six reserved bits, and the first indication information occupies the $2^{nd}$ to the $4^{th}$ bits in the six bits.

The bit occupied by the first indication information alternatively are a bit determined by the network device based on a quantity of CSI-RSs indicated by the first indication information. For details, refer to the bit occupied by the first indication information in the foregoing case I for understanding. The details are not described again.

III. The DCI carries only the third indication information.

In this case, the third indication information indicates that the first indication information does not exist.

In this case, the third indication information occurpies one or more bits in the DCI. The one or more bits is all or a part of reserved bits in the DCI.

In this case, the network device does not generate the first indication information, and the DCI does not need to carry the first indication information. The DCI carries only the third indication information to notify the terminal device that the first indication information does not exist. In this case, the terminal device directly uses an SSB measurement method in a conventional technology to perform time-frequency tracking, radio resource measurement, and the like.

IV. The DCI carries only the second indication information.

That is, the network device indicates, by using the DCI, only the terminal group that receives the PDSCH scheduled by using a PDCCH to which the DCI belongs.

In response to the DCI carrying only the second indication information, the second indication information occupies one or more bits in the DCI. The one or more bits is all or a part of reserved bits in the DCI.

In response to the DCI carrying only the second indication information, the one or more bits occupied by the second indication information are similar to the one or more bits occupied by the first indication information in response to the DCI carrying only the first indication information. For one or more actual bits in the DCI that correspond to the one or more bits occupied by the second indication information, refer to the descriptions of the bit occupied by the first indication information in the foregoing case I. Details are not described herein again.

V. The DCI carries the second indication information and the fourth indication information.

In this case, the fourth indication information indicates that the second indication information exists.

The case in which the DCI carries the second indication information and the fourth indication information is similar to the case in which the DCI carries the first indication information and the third indication information. For details, refer to the foregoing descriptions provided in response to the DCI carrying the first indication information and the third indication information. The details are not described herein again.

VI. The DCI carries the fourth indication information.

In this case, the fourth indication information indicates that the second indication information does not exist.

The case in which the DCI carries the fourth indication information is similar to the case in which the DCI carries the third indication information. For details, refer to the foregoing descriptions provided in response to the DCI carrying the third indication information. The details are not described herein again.

VII. The DCI carries the first indication information and the second indication information.

The first indication information and the second indication information each occupy one or more bits in the DCI.

In at least one embodiment, the bits occupied by the first indication information and the second indication information is fixed bits in the DCI determined by the network device. For example, in response to the DCI including six reserved bits, the first indication information occupies the first three bits in the six reserved bits. The second indication information occupies the last three bits in the six reserved bits.

In another possible implementation, the bits occupied by the first indication information and the second indication information is bits in the DCI that are allocated by the network device to the first indication information and the second indication information based on bits that need to be respectively occupied by the first indication information and the second indication information. For example, in response to the DCI including six reserved bits, in response to the first indication information occurpying three bits, and the second indication information occurpying two bits, the network device determines that the first indication information occupies the first three bits in the six reserved bits, and the second indication information occupies the $4^{th}$ bit and the $5^{th}$ bit in the six reserved bits.

VIII. The DCI carries at least the third indication information and the fourth indication information.

In this case, the network device separately determiens, in the following manner 1 and manner 2, a bit occupied by each piece of indication information.

Manner 1:

Each piece of indication information occupies a fixed bit.

For example, in response to the third indication information indicating that the first indication information exists, and the fourth indication information indicates that the second indication information exists, the DCI further carries the first indication information and the second indication information. In response to the DCI including six reserved bits, the third indication information occupies a first bit in the six reserved bits, the fourth indication information occupies a second bit in the six reserved bits, the first indication information occupies a third bit and a fourth bit in the six reserved bits, and the second indication information occupies a fifth bit and a sixth bit in the six reserved bits.

Manner 2:

The network device determines, depending on whether the first indication information exists and whether the second indication information exists that are respectively indicated by the third indication information and the fourth indication information, the bit occupied by each piece of indication information. The following provides descriptions in cases.

In the manner 2, the third indication information occupies a first bit, and the fourth indication information occupies a second bit.

Case 1: The third indication information indicates that the first indication information exists, and the fourth indication information indicates that the second indication information exists.

In this case, the DCI further carries the first indication information and the second indication information. The first indication information occupies a third bit and a fourth bit, and the second indication information occupies a fifth bit and a sixth bit.

Case 2: The third indication information indicates that the first indication information exists, and the fourth indication information indicates that the second indication information does not exist.

In this case, the DCI further carries the first indication information. The first indication information occupies a third bit, a fourth bit, a fifth bit, and a sixth bit.

Case 3: The third indication information indicates that the first indication information does not exist, and the fourth indication information indicates that the second indication information exists.

In this case, the DCI further carries the second indication information. The second indication information occupies a third bit, a fourth bit, a fifth bit, and a sixth bit.

Case 4: The third indication information indicates that the first indication information does not exist, and the fourth indication information indicates that the second indication information does not exist.

In this case, the DCI carries only the third indication information and the fourth indication information. A third bit, a fourth bit, a fifth bit, and a sixth bit are not occupied by any indication information.

The first bit to the sixth bit may respectively correspond to the $1^{st}$ bit to the $6^{th}$ bit in the six reserved bits in the DCI, or there is another correspondence between the first bit to the sixth bit and the six reserved bits in the DCI. This is not limited in embodiments described herein.

Using an example in which the DCI includes six reserved bits, the following separately describes the case 1 to the case 4 with examples.

The network device allocates the $1^{st}$ bit in the six reserved bits to the third indication information, and allocates the $2^{nd}$ bit to the fourth indication information.

For the case 1, the network device determines that the first indication information occupies the $3^{rd}$ bit and the $4^{th}$ bit in the six reserved bits, and determines that the second indication information occupies the $5^{th}$ bit and the $6^{th}$ bit in the six reserved bits.

For the case 2, the network device determines that the first indication information occupies the $3^{rd}$ bit, the $4^{th}$ bit, the $5^{th}$ bit, and the $6^{th}$ bit in the six reserved bits.

For the case 2, the fourth indication information indicates that the second indication information does not exist. In this case, the DCI does not need to include the second indication information. In this case, the network device enables the first indication information to occupy the remaining four bits in the six reserved bits.

The first indication information occupies the remaining four bits in the six reserved bits does not mean that the first indication information occupies the remaining four bits. The network device determines, based on a bit that the first indication information occupies, a bit to be actually occupied by the first indication information. For example, in response to the first indication information occurpyng only two bits, the network device uses the $3^{rd}$ bit and the $4^{th}$ bit in the six reserved bits to carry the first indication information. The network device still uses the remaining two bits as reserved bits, or the network device uses the remaining two bits to carry other information.

For the case 3, the network device determines that the second indication information occupies the $3^{rd}$ bit, the $4^{th}$ bit, the $5^{th}$ bit, and the $6^{th}$ bit in the six reserved bits.

For the case 3, the third indication information indicates that the first indication information does not exist. In this case, the DCI does not need to include the first indication information. In this case, the network device enables the second indication information to occupy the remaining four bits in the six reserved bits.

The second indication information occupies the remaining four bits in the six reserved bits does not mean that the second indication information occupies the remaining four bits. The network device determines, based on a bit that the second indication information occupies, a bit to be actually occupied by the second indication information. For example, in response to the second indication information occupying only two bits, the network device uses the $3^{rd}$ bit and the $4^{th}$ bit in the six reserved bits to carry the second indication information. The network device still uses the remaining two bits as reserved bits, or the network device uses the remaining two bits to carry other information.

For the case 4, the network device determines that the $3^{rd}$ bit, the $4^{th}$ bit, the $5^{th}$ bit, and the $6^{th}$ bit in the six reserved bits are not occupied by any indication information.

For the case 4, the third indication information indicates that the first indication information does not exist, and the fourth indication information indicates that the second indication information does not exist. In this case, the DCI does not need to include the first indication information or the second indication information. Therefore, the network device determines that the $3^{rd}$ bit, the $4^{th}$ bit, the $5^{th}$ bit, and the $6^{th}$ bit in the six reserved bits are not occupied by any indication information. The network device still uses the remaining four bits as reserved bits, or the network device uses the remaining four bits to carry other information.

In the foregoing embodiment, the bit occupied by each piece of indication information is merely an example. During actual implementation, each piece of indication information alternatively occupies another bit. A specific occupied bit is not limited in embodiments described herein.

The DCI sent by the network device on the PDCCH monitoring occasion further includes a short message indicator. The short message indicator indicates whether a paging function is scheduled by using the DCI. In response to the short message indicator indicating that the paging function is not scheduled by using the DCI, the terminal device does not need to further receive the PDSCH scheduled by using the PDCCH to which the DCI belongs. Therefore, in response to the short message indicator indicates that the paging function is not scheduled by using the DCI, the DCI does not include the second indication information and/or the fourth indication information; or the DCI includes the second indication information and/or the fourth indication information, but the terminal device does not parse the second indication information and/or the fourth indication information included in the DCI.

In at least one embodiment of S103, the network device configures the N CSI-RSs for the terminal device by using K SIBs, where there is a correspondence between the K SIBs and the M SSBs, the M SSBs are the SSBs actually sent by the network device, and K is a positive integer. CSI-RSs configured by the network device by using different SIBs is the same or is different.

That the network device configures a CSI-RS for the terminal device by using a SIB is implemented as follows: The network device adds, to the SIB, configuration information of the CSI-RS that is to be configured, and the network device sends the SIB to the terminal device. The terminal device determines the configuration information of the CSI-RS based on the SIB.

In at least one embodiment, the network device configures, for the terminal device by using a SIB in the K SIBs that corresponds to a target SSB, a CSI-RS corresponding to the target SSB. A correspondence between a SIB and an SSB is as follows: The SSB includes configuration information indicating a PDCCH of a corresponding SIB, or the SIB and the SSB are in a same spatial direction or similar spatial directions.

For example, the network device configures, by using a SIB corresponding to an SSB, a CSI-RS in spatial location relationship to the SSB.

For another example, the network device configures, by using a SIB corresponding to an SSB, a CSI-RS in QCL-typeD relationship to the SSB.

For still another example, the network device configures, by using a SIB corresponding to an SSB, a CSI-RS whose beam direction is the same as or similar to that of the SSB. That the beam directions are the same means that the beam direction of the SSB is completely the same as the beam direction of the CSI-RS, and that the beam directions are similar means that a similarity between the beam direction of the SSB and the beam direction of the CSI-RS is greater than a preset value.

In an implementation of S101, the first indication information indicates, by using one bit, whether the at least one CSI-RS corresponding to the first indication information is available (where this scenario is denoted as a scenario a). Alternatively, the first indication information respectively indicates, by using a plurality of bits, whether the at least one CSI-RS corresponding to the first indication information is available (where this scenario is denoted as a scenario b). The following separately describes the scenario a and the scenario b.

Whether the CSI-RS is available also means whether the CSI-RS is to be sent by the network device. In response to the CSI-RS being sent by the network device, the CSI-RS is available. In response to the CSI-RS not being sent by the network device, the CSI-RS is unavailable.

Scenario a: The first indication information indicates, by using one bit, whether the at least one CSI-RS corresponding to the first indication information is available.

For example, in response to the first indication information indicating whether three CSI-RSs are available, the first indication information indicates, by using a value of one bit, whether the three CSI-RSs are available.

The bit is a predetermined bit, for example, the $1^{st}$ bit in the reserved bits in the DCI.

In at least one embodiment, in response to the network device setting the value of the bit to "1", setting the bit to "1" indicates that the network device indicates, by using the first indication information, that the CSI-RS is available. In response to the network device setting the value of the bit to "0", setting the value of the bit to "0" indicates that the network device indicates, by using the first indication information, that the CSI-RS is unavailable.

In the scenario a, in response to the CSI-RSs corresponding to the first indication information being available, the network device sets the value of the bit to 1. In response to a part or none of the CSI-RSs corresponding to the first indication information being available, the network device sets the value of the bit to 0.

Alternatively, in response to all or a part of the CSI-RSs corresponding to the first indication information beng available, the network device sets the value of the bit to 1. In response to none of the CSI-RSs corresponding to the first indication information being available, the network device sets the value of the bit to 0.

Scenario b: The first indication information respectively indicates, by using the plurality of bits, whether the at least one CSI-RS corresponding to the first indication information is available.

In at least one embodiment, a quantity of bits in the plurality of bits is equal to the quantity of CSI-RSs indicated by the first indication information.

For example, in response to the first indication information indicating A CSI-RSs, the first indication information includes A bits to respectively indicate whether the A CSI-RSs are available. The A CSI-RSs correspond one-to-one to the A bits.

An example in which the first indication information indicates three CSI-RSs is used below for description.

Bits in the first indication information that indicate whether the three CSI-RSs are available are the first three bits in the six reserved bits in the DCI to which the first indication information belongs.

The $1^{st}$ bit in the three bits indicates whether the first CSI-RS in the three CSI-RSs is available. The $2^{nd}$ bit in the three bits indicates whether the second CSI-RS in the three CSI-RSs is available. The $3^{rd}$ bit in the three bits indicates whether the third CSI-RS in the three CSI-RSs is available.

In response to a value of a bit being "1", the bit indicates that a corresponding CSI-RS is available. In response to a value of a bit being "0", the bit indicates that a corresponding CSI-RS is unavailable.

In an example, in response to the three bits in the first indication information being "1", "0", and "1", the first indication information indicates that the first CSI-RS and the third CSI-RS in the three CSI-RSs are available, and the second CSI-RS is unavailable.

Based on the foregoing technical solution, in the scenario a, the first indication information occupies only one bit to indicate whether the corresponding CSI-RSs are available, thereby reducing a quantity of bits occupied by the first indication information. In the scenario b, the first indication information indicates, by using the bits, whether the corresponding CSI-RSs are available, so that indication precision of the first indication information is greatly improved.

With reference to S101, the first indication information indicates that the at least one CSI-RS is available, the at least one CSI-RS corresponds to the at least one SSB, and the at least one SSB corresponds to the PDCCH monitoring occasion for sending the DCI including the first indication information.

In other words, there is a correspondence between the at least one CSI-RS indicated by the first indication information and the SSB corresponding to the PDCCH monitoring occasion for sending the DCI including the first indication information. The correspondence is a QCL-typeD relationship-based correspondence, the spatial location relationship-based correspondence, a correspondence in which beam directions are the same or similar, or the like. For a correspondence among the first indication information, the SSB, and the CSI-RS, refer to the descriptions in S101, S104, and S105. Details are not described herein again.

Based on this, the network device limits, by using the correspondence between the SSB and the CSI-RS, a CSI-RS that is indicated by the first indication information. This reduces a quantity of CSI-RSs that need to be indicated by the first indication information, and further reduces the quantity of bits occupied by the first indication information.

However, a PDCCH on which one piece of DCI is located corresponds to a plurality of SSBs, and one SSB corresponds to a plurality of CSI-RSs (where the correspondence is specifically the QCL-typeD relationship-based correspondence, the spatial location relationship-based correspondence, the correspondence in which beam directions are the same or similar, or the like). Therefore, first indication information in one piece of DCI still indicates a plurality of CSI-RSs. In other words, the first indication information still indicates a large quantity of CSI-RSs. Consequently, the first indication information still occupies a large quantity of bits.

To resolve this problem, at least one embodiment provides a communication method.

A time window is set between a first PO and a second PO, to further limit the CSI-RS that is indicated by the first indication information. The first indication information indicates only whether a CSI-RS that is in the CSI-RSs corresponding to the SSB corresponding to the first indication information and that is located in the time window is available. For a CSI-RS outside the time window, regardless of whether the CSI-RS corresponds to the SSB corresponding to the first indication information, the first indication information does not indicate whether the CSI-RS is available. In this way, the quantity of CSI-RSs that need to be indicated by the first indication information is further reduced, to reduce the quantity of bits occupied by the first indication information. The first PO is the same PO described in S101.

On the first PO, the network device sends the DCI including the first indication information. In the time window, the terminal device measures the CSI-RS indicated by the first indication information as available, to perform time-frequency tracking and radio resource measurement, so that the terminal device and the network device are time-frequency synchronized. Time-frequency synchronization helps the terminal device monitor a PDCCH on the second PO. The terminal device monitors the PDCCH on the second PO, to obtain DCI sent by the network device. The second PO follows the first PO, the time window is located between the first PO and the second PO, and the time window includes one or more slots between the first PO and the second PO.

A process in which the network device determines the CSI-RS in the time window is as follows: The network device determines time-domain information of the time window and time-domain information of the CSI-RS. In response to a CSI-RS being located in the time window in time domain, the network device determines that the CSI-RS is a CSI-RS in the time window.

A start moment of the time window is an end moment of the first PO, or follows the end moment of the first PO. An end moment of the time window is a start moment of the second PO, or is followed by the start moment of the second PO.

In at least one embodiment, the network device determines the start moment and the end moment of the time window by using one or more of the following parameters. The parameters include the first PO, the second PO, an offset, and a size of the time window. The following provides examples for description.

Example 1: The network device determines that the start moment of the time window is the end moment of the first PO. The network device determines that End moment of the time window=End moment of the first PO+Offset or End moment of the time window=Start moment of the second PO−Offset.

Example 2: The network device determines that Start moment of the time window=End moment of the first PO+Offset or Start moment of the time window=Start moment of the second P−Offset. The network device determines that the end moment of the time window is the start moment of the second PO.

Example 3: The network device sets two offsets, namely, a first offset and a second offset. The network device determines that Start moment of the time window=End moment of the first PO+First offset, and End moment of the time window=End moment of the first PO+Second offset. The first offset is less than or equal to the second offset.

Example 4: The network device determines that Start moment of the time window=Start moment of the second P−First offset, and End moment of the time window=Start moment of the second P−Second offset. The first offset is greater than or equal to the second offset.

Example 5: The network device determines that Start moment of the time window=End moment of the first PO+First offset, and End moment of the time window=Start moment of the second P−Second offset.

Example 6: The network device determines that Start moment of the time window=Start moment of the second P−Second offset, and End moment of the time window=End moment of the first P−First offset.

Example 7: The network device determines that the start moment of the time window is the end moment of the first PO, and End moment of the time window=End moment of the first PO+Size of the time window.

Example 8: The network device determines that the end moment of the time window is the start moment of the second PO, and Start moment of the time window=Start moment of the second P−Size of the time window.

Example 9: The network device determines that Start moment of the time window=End moment of the first PO+Offset, and End moment of the time window=Start moment of the time window+Size of the time window.

Example 10: The network device determines that Start moment of the time window=Start moment of the second P−Offset, and End moment of the time window=Start moment of the time window+Size of the time window.

The foregoing offsets are positive numbers. The offset is represented by a quantity of slots, a quantity of symbols, or a time length (for example, a time length measured in milliseconds or microseconds). The following describes the offset with reference to the foregoing examples.

With reference to the example 1, in response to the offset being the quantity of slots, Offset=Last slot in the time window−Last slot in the first PO. In response to the offset being the quantity of symbols, Offset=Last symbol in the time window−Last symbol in the first PO. In response to the offset being the time length, Offset=End moment of the time window−End moment of the first PO.

With reference to the example 2, in response to the offset being the quantity of slots, Offset=$1^{st}$ slot in the time window−Last slot in the first PO. In response to the offset being the quantity of symbols, Offset=First symbol in the time window−Last symbol in the first PO. In response to the offset being the time length, Offset=Start moment of the time window−End moment of the first PO.

With reference to the example 3, in response to the offset being the quantity of slots, First offset=$1^{st}$ slot in the time window−Last slot in the first PO, and Second offset=Last slot in the time window−Last slot in the first PO. In response to the offset being the quantity of symbols, First offset=First symbol in the time window−Last symbol in the first PO, and Second offset=Last symbol in the time window−Last symbol in the first PO. In response to the offset being the time length, First offset=Start moment of the time window−End moment of the first PO, and Second offset=End moment of the time window−End moment of the first PO.

With reference to the example 4, in response to the offset being the quantity of slots, First offset=$1^{st}$ slot in the second P−$1^{st}$ slot in the time window, and Second offset=$1^{st}$ slot in the second P−Last slot in the time window. In response to the offset being the quantity of symbols, First offset=First symbol in the second P−First symbol in the time window, and Second offset=First symbol in the second P−Last symbol in the time window. In response to the offset being the time length, First offset=Start moment of the second P−Start moment of the time window, and Second offset=Start moment of the second P−End moment of the time window.

With reference to the example 5, in response to the offset being the quantity of slots, First offset=$1^{st}$ slot in the time window−Last slot in the first PO, and Second offset=$1^{st}$ slot in the second P−Last slot in the time window. In response to the offset being the quantity of symbols, First offset=First symbol in the time window−Last symbol in the first PO, and Second offset=First symbol in the second P−Last symbol in the time window. In response to the offset being the time length, First offset=Determined start moment of the time window−End moment of the first PO, and Second offset=Start moment of the second P−End moment of the time window.

With reference to the example 6, in response to the offset being the quantity of slots, Second offset=$1^{st}$ slot in the second P−$1^{st}$ slot in the time window, and First offset=Last slot in the time window−Last slot in the first PO. In response to the offset being the quantity of symbols, Second offset=First symbol in the second P−First symbol in the time window, and First offset=Last symbol in the time window−Last symbol in the first PO. In response to the offset being the time length, Second offset=Start moment of the second P−Start moment of the time window, and First offset=End moment of the time window−End moment of the first PO.

Similarly, the size of the time window is also represented by a quantity of slots, a quantity of symbols, or a time length (for example, the time length measured in milliseconds or microseconds). The following describes the size of the time window with reference to the foregoing examples.

With reference to the example 7, in response to the size of the time window being the quantity of a slot, Size of the time window=Last slot in the time window−Last slot in the first PO. In response to the size of the time window being the quantity of a symbol, Size of the time window=Last symbol in the time window−Last symbol in the first PO. In response to the size of the time window being the time length, Size of the time window=End moment of the time window−End moment of the first PO.

With reference to the example 8, in response to the size of the time window being the quantity of a slot, Size of the time window=$1^{st}$ slot in the second PO−$1^{st}$ slot in the time window. In response to the size of the time window being the quantity of a symbol, Size of the time window=First symbol in the second P−First symbol in the time window.

With reference to the example 9 or the example 10, in response to the size of the time window being the quantity of a slot, Size of the time window=Last slot in the time window−slot in the time window.

Figure 10:
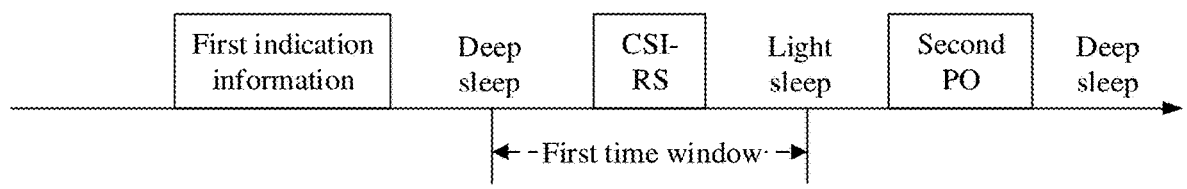
FIG. 10 is a diagram of a time-domain position relationship among first indication information, a time window, and a second PO according to at least one embodiment.

FIG. 10 is a diagram of a time-domain position relationship among first indication information, a time window, and a second PO according to at least one embodiment. The first indication information is first indication information sent on a first PO. A time-domain position relationship between the first indication information and the time window is the same as a time-domain position relationship between the first PO and the time window. After the first PO, a terminal device enters a deep sleep (DeepSleep) state (where in response to a time interval between the first PO and the time window being short, the terminal device does not enter the deep sleep state, but enter a light sleep (LightSleep) state). The terminal device wakes up at a time-domain position that is in the time window and that is of a CSI-RS indicated as available, to enter a working state from the deep sleep state (or the light sleep state). The terminal device performs CSI-RS measurement on the CSI-RS indicated as available, to perform time-frequency synchronization between the terminal device and a network device. After completing the CSI-RS measurement, the terminal device enters the light sleep (LightSleep) state. The terminal device enters the working state from the light sleep state at a time-domain position of the second PO, and monitors a PDCCH on the second PO.

Before the first PO, the terminal device is in the deep sleep state or the light sleep state. For example, in response to the terminal device performing CSI-RS measurement before the first PO, the terminal device is in the light sleep state before the first PO. In response to the terminal device not performing CSI-RS measurement before the first PO, the terminal device is in the deep sleep state before the first PO.

Power consumption generated by the terminal device in the light sleep state is greater than that generated by the terminal device in the deep sleep state. Therefore, to reduce the power consumption of the terminal device, a time period for which the terminal device is in the light sleep state is to be shortened as much as possible. Based on this, in at least one embodiment, an end moment of the time window is fixed as a start moment of the second PO. In this way, after completing the CSI-RS measurement in the time window, the terminal device reaches the start moment of the second PO as soon as possible, to reduce a light sleep time period between a moment of completing the CSI-RS measurement and the start moment of the second PO, and increase a deep sleep time period of the terminal device before the time window.

In response to the second PO being the $1^{st}$ PO or an earlier PO in a DRX cycle, the time window is in a previous DRX cycle of the DRX cycle.

In at least one embodiment, to avoid a case in which the first indication information occupies a large quantity of bits because the first indication information indicates a large quantity of CSI-RSs, the network device sets a maximum quantity of CSI-RSs included in the time window, to further limit the quantity of bits occupied by the first indication information. In addition, in response to the maximum quantity of CSI-RSs in the time window being limited, the network device allocates a fixed quantity of bits in the DCI to the first indication information.

For example, in response to the network device setting the maximum quantity of CSI-RSs included in the time window to 3, the network device allocates three fixed bits in the DCI to the first indication information, to indicate whether the CSI-RSs in the time window are available.

Alternatively, in response to the time window including a large quantity of CSI-RSs, the at least one CSI-RS indicated by the first indication information is at least one CSI-RS in a plurality of CSI-RSs in the time window. In other words, the first indication information is able to be used to indicate whether a part of CSI-RSs in the time window are available, thereby reducing the quantity of bits occupied by the first indication information. The part of CSI-RSs is Z consecutive CSI-RSs in the time window that are closest to the start moment of the time window or Z consecutive CSI-RSs in the time window that are closest to the end moment of the time window. The time window includes Y CSI-RSs, where both Y and Z are positive integers, and Y≥Z.

For example, the time window includes six CSI-RSs, and the first indication information only indicates whether the last three CSI-RSs in the six CSI-RSs are available.

Based on the foregoing technical solution, the network device limits the maximum quantity of CSI-RSs in the time window, or indicates only a part of CSI-RSs in the time window in response to there being a large quantity of CSI-RSs in the time window, to reduce the quantity of bits occupied by the first indication information.

In at least one embodiment, a value of duration of the time window is related to the SSB.

For example, in response to an SSB periodicity configured by the network device being greater than a preset periodicity, the network device determines that the duration of the time window is preset duration. In response to an SSB periodicity configured by the network device being less than or equal to a preset periodicity, the network device determines that the duration of the time window is 0.

For another example, in response to an SSB periodicity configured by the network device being greater than or equal to a preset periodicity, the network device determines that the duration of the time window is preset duration. In response to an SSB periodicity configured by the network device being less than a preset periodicity, the network device determines that the duration of the time window is 0.

The duration of the time window is represented by a quantity of slots or a time length (for example, a time length measured in milliseconds or microseconds). In response to the duration of the time window being 0, the network device does not set the time window.

A reason is as follows: In response to the SSB periodicity configured by the network device being less than the preset periodicity, power consumption of the terminal device is still low in response to the terminal device performing SSB measurement to implement the time-frequency tracking and the radio resource measurement. In this case, the terminal device performs time-frequency tracking and radio resource measurement through the SSB measurement. Therefore, in this case, the network device configures the duration of the time window to 0 or does not set the time window, where the time window includes no CSI-RS. Before the second PO, the terminal performs SSB measurement instead of CSI-RS measurement.

Correspondingly, in this case, to reduce signaling overheads of the network device, the network device does not send the first indication information; to reduce the power consumption of the terminal device, the terminal device does not perform CSI-RS measurement.

In at least one embodiment, the first PO and the second PO is in a same DRX cycle (where this case is denoted as a case A), or the first PO and the second PO is in different DRX cycles (where this case is denoted as a case B). The following separately describes time-domain position relationships between the first PO and the second PO in the case A and the case B.

Case A: The first PO and the second PO are in the same DRX cycle.

The CSI-RS that is in the time window and that is indicated by the first indication information as available is inconsistent with a CSI-RS actually sent by the network device. A shorter time interval between the first indication information and the time window indicates higher consistency between the CSI-RS that is in the time window and that is indicated by the first indication information as available and the CSI-RS actually sent by the network device.

Therefore, to improve the consistency between the CSI-RS indicated by the first indication information as available and the CSI-RS actually sent by the network device, a time interval between the first PO and the time window is as short as possible.

Based on this, the first PO is a PO adjacent to the second PO and followed by the second PO. The time window is between the first PO and the second PO. In this case, in response to the second PO being not the $1^{st}$ PO in a DRX cycle, the first PO and the second PO are in the same DRX cycle. In response to the second PO being the $1^{st}$ PO in a DRX cycle, the first PO is in a DRX cycle followed by the DRX cycle to which the second PO belongs.

In this way, after receiving the first indication information on the first PO, the terminal device determines the CSI-RSs indicated as available. In the time window, the terminal device measures these CSI-RSs indicated as available. This avoids a case in which the CSI-RS indicated as available on the first PO is not sent by the network device in the time window due to a long time interval between the first PO and the time window.

In response to the first PO being the PO adjacent to the second PO and followed by the second PO, the time interval between the time window and the first PO is short. In this case, after the first PO, the terminal enters the light sleep state instead of the deep sleep state. The terminal device enters a wake-up state from the light sleep state at a time-domain position of the first available CSI-RS in the time window, to perform CSI-RS measurement.

Case B: The first PO and the second PO are in the different DRX cycles.

In this case, a DRX cycle to which the first PO belongs and a DRX cycle to which the second PO belongs are adjacent DRX cycles, and the first PO and the second PO are POs that need to be monitored by the same terminal device.

On the first PO of the first DRX cycle, the terminal device receives the first indication information sent by the network device, and determines the available CSI-RS based on the first indication information. The terminal device wakes up at a time-domain position of the first available CSI-RS in the time window, to measure the CSI-RS in the time window. On the second PO of the second DRX cycle, the terminal device monitors a PDCCH on the second PO.

In this way, the terminal device wakes up on a PO that is monitored by the terminal device, to obtain the first indication information, and does not need to wake up on another PO to obtain the first indication information. Therefore, a time period for which and a quantity of times that the terminal device wakes up is reduced, thereby reducing the power consumption of the terminal device.

The foregoing describes the possible implementations of the communication method described in at least one embodiment in response to the first indication information being carried in the DCI on the PO. During actual application, the first indication information alternatively is indicated by other signaling such as newly added signaling. The following provides specific descriptions by using the case in which the first indication information is indicated by the newly added signaling.

In response to the first indication information being indicated by the newly added signaling (first signaling), the first signaling is a set of PDCCH monitoring occasions. The first signaling includes a plurality of slots. The first indication information is indicated by DCI in the first signaling. The DCI in the first signaling is sent on a PDCCH monitoring occasion of the first signaling.

Specifically, the DCI in the first signaling is sent on any PDCCH monitoring occasion before the time window (not limited to being sent on the PDCCH in the PO). For a specific implementation of the first signaling, refer to the foregoing implementation of the DCI sent on the PDCCH monitoring occasion. Details are not described herein again. The first signaling has a structure similar to that of the PO. For example, the first signaling includes a plurality of PDCCH monitoring occasions.

Similarly, for a correspondence (including indicated CSI-RS information, a time-domain position relationship, and the like) among the first signaling, the time window, and the second PO, refer to the foregoing correspondence among the first PO, the time window, and the second PO. Details are not described herein again.

A difference between indicating the first indication information by the DCI in the first signaling and including the first indication information in the DCI on the PO lies in that:

The first signaling is the newly added signaling. In this way, a relationship among slot locations of the first signaling, the time window, and the second PO is not limited by a slot allocated by the network device to the PO. The DCI in the first signaling is sent in a slot of any PDCCH before the time window.

A time-domain position of the first signaling is configured by using a search space. For example, the network device configures, by using the search space, a temporal distance between the first signaling and the second PO to a fixed value.

Alternatively, a time-domain position of the first signaling is determined based on an offset and a time-domain position of the first CSI-RS or the first available CSI-RS in the time window.

For example, Last slot in the first signaling=First slot−Offset.

For another example, $1^{st}$ slot in the first signaling=First slot−Offset.

For still another example, Monitoring slot in the first signaling=First slot−Offset.

The first slot is any slot (for example, the $1^{st}$ slot or the last slot) of the first CSI-RS or any slot (for example, the $1^{st}$ slot or the last slot) of the first available CSI-RS.

In at least one embodiment, in addition to being located between two Pos, the time window alternatively is located in one paging frame (PF) or between two PFs.

For example, in response to the time window including one or more slots between a plurality of Pos in one PF, the first indication information indicates whether a CSI-RS in the one or more slots between the plurality of Pos in the PF is available.

For another example, in response to the time window including a slot followed by the first PO in a PF, the first indication information indicates whether a CSI-RS in the slot followed by the first PO is available.

The terminal device wakes up in a sending time period of the CSI-RS based on the time-domain information of the available CSI-RS, and measures the CSI-RS. In this way, in response to the network device configuring a small quantity of CSI-RSs, the first indication information indicates the CSI-RS in one PF or between two PFs, to improve utilization of the first indication information, and reduce a quantity of pieces of first indication information that need to be sent by the network device.

The solutions in the foregoing embodiments are combined on a premise that there is no contradiction.

The foregoing mainly describes the solutions in at least one embodiment from a perspective of interaction between network elements. To implement the foregoing functions, the network elements such as the network device and the terminal device include at least one of corresponding hardware structures and software modules for performing the functions. A person skilled in the art is aware that, in combination with units and algorithm steps of the examples described in at least one embodiment, embodiments described herein are implemented by hardware or a combination of hardware and computer software. Whether a function is performed by hardware or hardware driven by computer software depends on particular applications and design constraints of the technical solutions. A person skilled in the art is able to use different methods to implement the described functions for each particular embodiment.

In at least one embodiment the network device and the terminal device is divided into functional units based on the method examples. For example, each functional unit is obtained through division based on each corresponding function, or two or more functions is integrated into one processing unit. The integrated unit is implemented in a form of hardware, or is implemented in a form of a software function unit. In this embodiment, division into units is an example, and is merely logical function division. During actual implementation, another division manner is used.

Figure 5:
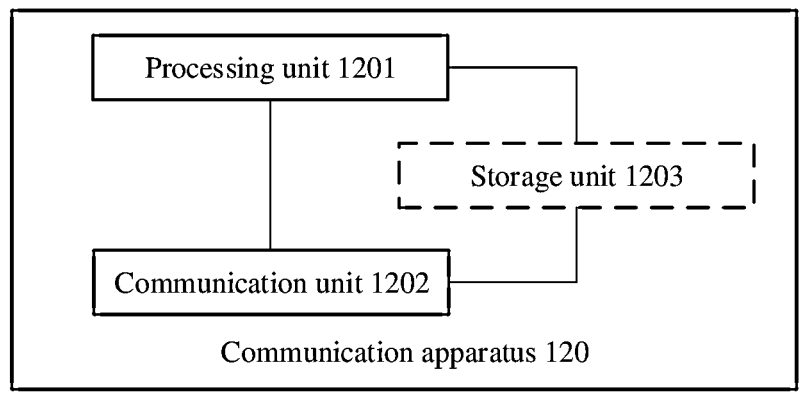
FIG. 5 is a schematic diagram of a structure of a communication apparatus according to at least one embodiment.

In response to an integrated unit being used, FIG. 5 is a possible schematic diagram of a structure of a communication apparatus (denoted as a communication apparatus 120) in the foregoing embodiments. The communication apparatus 120 includes a processing unit 1201 and a communication unit 1202, and further incudes a storage unit 1203. The schematic diagram of the structure shown in FIG. 5 is used to show structures of the network device and the terminal device in the foregoing embodiments.

In response to the schematic diagram of the structure shown in FIG. 5 being used to show the structure of the terminal device in the foregoing embodiments, the processing unit 1201 is configured to control and manage actions of the terminal device, for example, control the terminal device to perform S101 and S102 in FIGS. 2, S101, S102, S103, and S105 in FIG. 3, and/or an action performed by the terminal device in another process described in at least one embodiment. The processing unit 1201 communicates with another network entity through the communication unit 1202, for example, communicate with the network device shown in FIG. 2. The storage unit 1203 is configured to store program code and data of the terminal device.

In response to the schematic diagram of the structure shown in FIG. 5 being used to show the structure of the terminal device in the foregoing embodiments, the communication apparatus 120 is a terminal device, or is a chip in the terminal device.

In response to the schematic diagram of the structure shown in FIG. 5 being used to show the structure of the network device in the foregoing embodiments, the processing unit 1201 is configured to control and manage actions of the network device, for example, control the network device to perform S101 and S102 in FIGS. 2, S101, S102, S103, S104, and S105 in FIG. 3, and/or an action performed by the network device in another process described in at least one embodiment. The processing unit 1201 communicates with another network entity through the communication unit 1202, for example, communicate with the terminal device shown in FIG. 2. The storage unit 1203 is configured to store program code and data of the network device.

In response to the schematic diagram of the structure shown in FIG. 5 being used to show the structure of the network device in the foregoing embodiments, the communication apparatus 120 is a network device, or is a chip in the network device.

In response to the communication apparatus 120 being the terminal device or the network device, the processing unit 1201 is a processor or a controller, and the communication unit 1202 is a communication interface, a transceiver, a transceiver circuit, a transceiver apparatus, or the like. The communication interface is a collective term, and includes one or more interfaces. The storage unit 1203 is a memory. In response to the communication apparatus 120 being the chip in the terminal device or the network device, the processing unit 1201 is a processor or a controller, and the communication unit 1202 is an input interface and/or an output interface, a pin, a circuit, or the like. The storage unit 1203 is a storage unit (for example, a register or a cache) in the chip, or is a storage unit (for example, a read-only memory (ROM) or a random access memory (RAM)) in the terminal device or the network device but outside the chip.

The communication unit is also referred to as a transceiver unit. An antenna and a control circuit with sending and receiving functions in the communication apparatus 120 is considered as the communication unit 1202 of the communication apparatus 120, and a processor with a processing function is considered as the processing unit 1201 of the communication apparatus 120. Optionally, a component configured to implement the receiving function in the communication unit 1202 is considered as a receiving unit. The receiving unit is configured to perform a receiving step in at least one embodiment. The receiving unit is a receiver, a receiver circuit, or the like. A component configured to implement the sending function in the communication unit 1202 is considered as a sending unit. The sending unit is configured to perform a sending step in at least one embodiment. The sending unit is a transmitter, a transmitter circuit, or the like.

In response to the integrated unit in FIG. 5 being implemented in a form of a software function module and sold or used as an independent product, the integrated unit is stored in a computer-readable storage medium. Based on such an understanding, the technical solutions in at least one embodiment essentially, the part contributing to the prior art, or all or some of the technical solutions is implemented in a form of a software product. The computer software product is stored in a storage medium and includes several instructions for instructing a computer device (which is a personal computer, a server, a network device, or the like) or a processor to perform all or some of the steps of the methods described in at least one embodiment. The storage medium storing the computer software product includes any medium that stores program code, such as a USB flash drive, a removable hard disk, a read-only memory, a random access memory, a magnetic disk, or an optical disc.

The unit in FIG. 5 is also referred to as a module. For example, the processing unit is referred to as a processing module.

Figure 6:
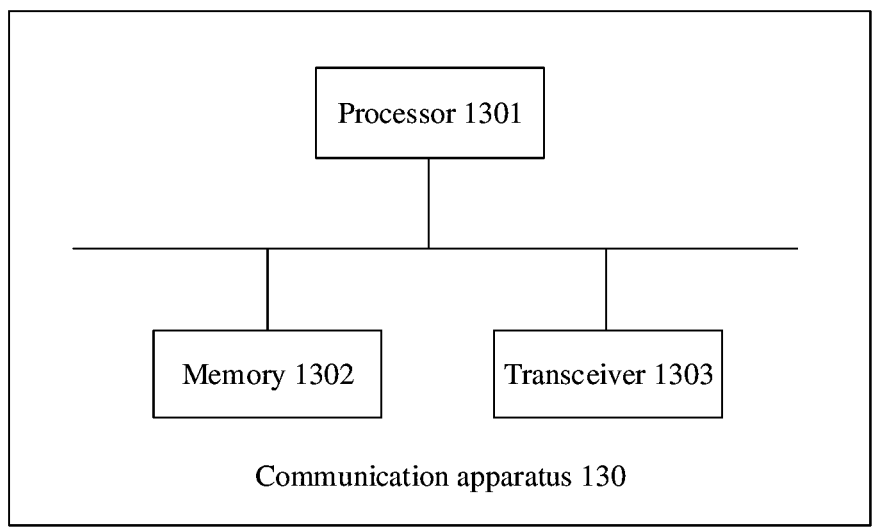
FIG. 6 is a schematic diagram of a hardware structure of a communication apparatus according to at least one embodiment.
Figure 7:
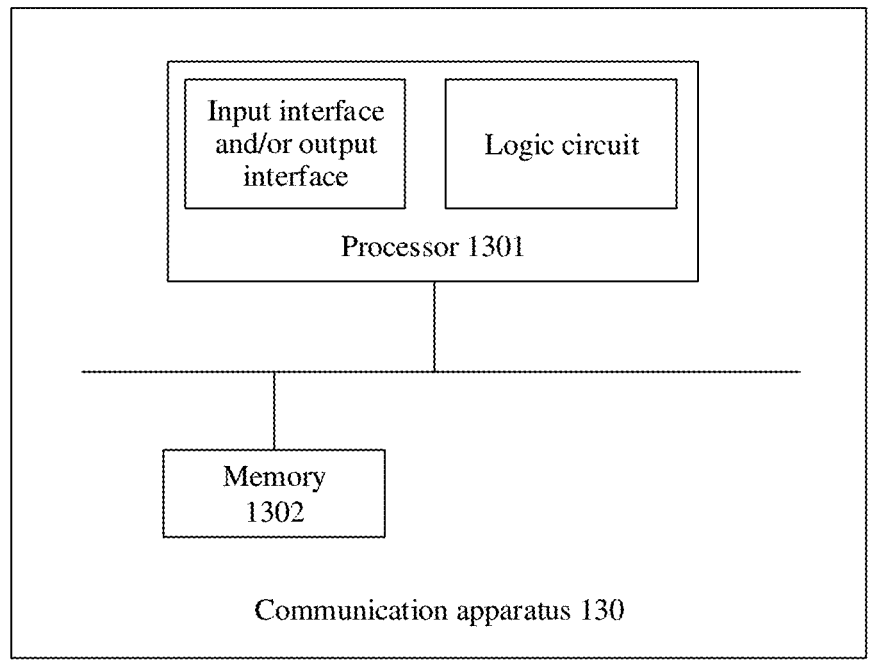
FIG. 7 is a schematic diagram of a hardware structure of another communication apparatus according to at least one embodiment.

At least one embodiment further provides a schematic diagram of a hardware structure of a communication apparatus (denoted as a communication apparatus 130). Refer to FIG. 6 or FIG. 7. The communication apparatus 130 includes a processor 1301, and optionally, further includes a memory 1302 connected to the processor 1301.

Refer to FIG. 6. In a first possible implementation, the communication apparatus 130 further includes a transceiver 1303. The processor 1301, the memory 1302, and the transceiver 1303 are connected through a bus. The transceiver 1303 is configured to communicate with another device or a communication network. Optionally, the transceiver 1303 includes a transmitter and a receiver. A component configured to implement a receiving function in the transceiver 1303 is considered as the receiver. The receiver is configured to perform a receiving step in at least one embodiment. A component configured to implement a sending function in the transceiver 1303 is considered as the transmitter. The transmitter is configured to perform a sending step in at least one embodiment.

Based on the first possible implementation, the schematic diagram of the structure shown in FIG. 6 is used to show a structure of the network device or the terminal device in the foregoing embodiments.

In response to the schematic diagram of the structure shown in FIG. 6 being used to show the structure of the terminal device in the foregoing embodiments, the processor 1301 is configured to control and manage actions of the terminal device. For example, the processor 1301 is configured to support the terminal device to perform S101 and S102 in FIGS. 2, S101, S102, S103, and S105 in FIG. 3, and/or an action performed by the terminal device in another process described in at least one embodiment. The processor 1301 communicates with another network entity through the transceiver 1303, for example, communicate with the network device shown in FIG. 2. The memory 1302 is configured to store program code and data of the terminal device.

In response to the schematic diagram of the structure shown in FIG. 6 being used to show the structure of the network device in the foregoing embodiments, the processor 1301 is configured to control and manage actions of the network device. For example, the processor 1301 is configured to support the network device to perform S101 and S102 in FIGS. 2, S101, S102, S103, S104, and S105 in FIG. 3, and/or an action performed by the network device in another process described in at least one embodiment. The processor 1301 communicates with another network entity through the transceiver 1303, for example, communicate with the terminal device shown in FIG. 2. The memory 1302 is configured to store program code and data of the network device.

In a second possible implementation, the processor 1301 includes a logic circuit and at least one of an input interface and an output interface. The output interface is configured to perform a sending action in a corresponding method, and the input interface is configured to perform a receiving action in the corresponding method.

Refer to FIG. 7. Based on the second possible implementation, the schematic diagram of the structure shown in FIG. 7 is used to show a structure of the network device or the terminal device in the foregoing embodiments.

In response to the schematic diagram of the structure shown in FIG. 7 being used to show the structure of the terminal device in the foregoing embodiments, the processor 1301 is configured to control and manage actions of the terminal device. For example, the processor 1301 is configured to support the terminal device to perform S101 and S102 in FIGS. 2, S101, S102, S103, and S105 in FIG. 3, and/or an action performed by the terminal device in another process described in at least one embodiment. The processor 1301 communicates with another network entity through at least one of the input interface and the output interface, for example, communicate with the network device shown in FIG. 2. The memory 1302 is configured to store program code and data of the terminal device.

In response to the schematic diagram of the structure shown in FIG. 7 being used to show the structure of the network device in the foregoing embodiments, the processor 1301 is configured to control and manage actions of the network device. For example, the processor 1301 is configured to support the network device to perform S101 and S102 in FIGS. 2, S101, S102, S103, S104, and S105 in FIG. 3, and/or an action performed by the network device in another process described in at least one embodiment. The processor 1301 communicates with another network entity through at least one of the input interface and the output interface, for example, communicate with the terminal device shown in FIG. 2. The memory 1302 is configured to store program code and data of the network device.

FIG. 6 and FIG. 7 alternatively show a system chip in the network device. In this case, an action performed by the network device is implemented by the system chip. For a specific action performed, refer to the foregoing descriptions. Details are not described herein again. FIG. 6 and FIG. 7 alternatively show a system chip in the terminal device. In this case, an action performed by the terminal device is implemented by the system chip. For a specific action performed, refer to the foregoing descriptions. Details are not described herein again.

In addition, at least one embodiment further provide a schematic diagram of a hardware structure of a terminal device (denoted as a terminal device 150) and a schematic diagram of a hardware structure of a network device (denoted as a network device 160). For details, refer to FIG. 8 and FIG. 9 respectively.

Figure 8:
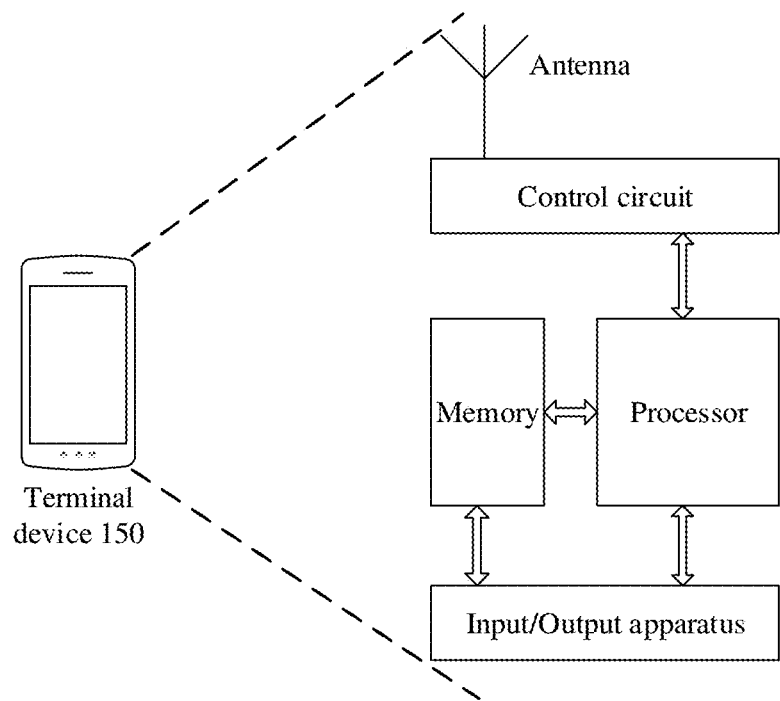
FIG. 8 is a schematic diagram of a hardware structure of a terminal device according to at least one embodiment.

FIG. 8 is the schematic diagram of the hardware structure of the terminal device 150. For ease of description, FIG. 8 shows only main components of the terminal device. As shown in FIG. 8, the terminal device 150 includes a processor, a memory, a control circuit, an antenna, and an input/output apparatus.

The processor is mainly configured to: process a communication protocol and communication data, control the entire terminal device, execute a software program, and process data of the software program. For example, the processor is configured to control the terminal device to perform S101 and S102 in FIGS. 2, S101, S102, S103, and S105 in FIG. 3, and/or an action performed by the terminal device in another process described in at least one embodiment. The memory is mainly configured to store the software program and the data. The control circuit (which is also referred to as a radio frequency circuit) is mainly configured to: perform conversion between a baseband signal and a radio frequency signal, and process the radio frequency signal. A combination of the control circuit and the antenna are also referred to as a transceiver, mainly configured to send/receive a radio frequency signal in a form of an electromagnetic wave. The input/output apparatus, such as a touchscreen, a display, or a keyboard, is mainly configured to: receive data entered by a user, and output data to the user.

After the terminal device is powered on, the processor reads the software program in the memory, interpret and execute instructions of the software program, and process the data of the software program. In response to the processor sending data through the antenna, after performing baseband processing on the to-be-sent data, the processor outputs a baseband signal to the control circuit. The control circuit performs radio frequency processing on the baseband signal and then sends a radio frequency signal to the outside in the form of the electromagnetic wave through the antenna. In response to data being sent to the terminal device, the control circuit receives a radio frequency signal through the antenna, converts the radio frequency signal into a baseband signal, and outputs the baseband signal to the processor. The processor converts the baseband signal into data, and processes the data.

A person skilled in the art understands that for ease of description, FIG. 8 shows only one memory and one processor. In an actual terminal device, there is a plurality of processors and memories. The memory is also referred to as a storage medium, a storage device, or the like. This is not limited in embodiments described herein.

In an optional implementation, the processor includes a baseband processor and a central processing unit. The baseband processor is mainly configured to process the communication protocol and the communication data. The central processing unit is mainly configured to control the entire terminal device, execute the software program, and process the data of the software program. The processor in FIG. 8 integrates functions of the baseband processor and the central processing unit. A person skilled in the art understands that the baseband processor and the central processing unit alternatively are independent processors, and are interconnected by using a technology such as a bus. A person skilled in the art understands that the terminal device includes a plurality of baseband processors to adapt to different network standards, the terminal device includes a plurality of central processing units to improve a processing capability of the terminal device, and components of the terminal device is connected through various buses. The baseband processor is also expressed as a baseband processing circuit or a baseband processing chip. The central processing unit is also expressed as a central processing circuit or a central processing chip. A function of processing the communication protocol and the communication data is built in the processor, or is stored in the memory in a form of a software program, where the processor executes the software program to implement a baseband processing function.

Figure 9:
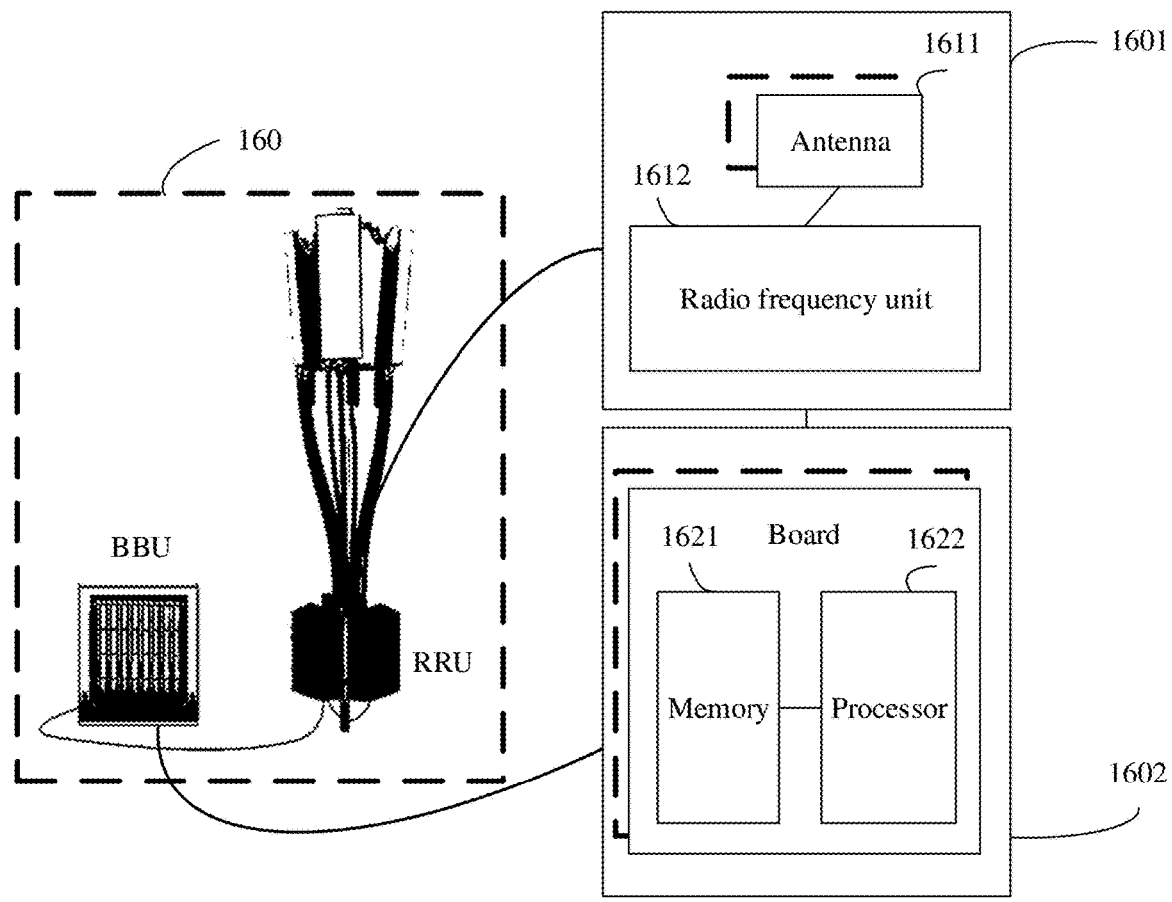
FIG. 9 is a schematic diagram of a hardware structure of a network device according to at least one embodiment.

FIG. 9 is the schematic diagram of the hardware structure of the network device 160. The network device 160 includes one or more radio frequency units, such as a remote radio unit (RRUs) 1601 and one or more baseband units (BBUs) (which is also referred to as digital units (DUs)) 1602.

The RRU 1601 is referred to as a transceiver unit, a transceiver, a transceiver circuit, or the like, and includes at least one antenna 1611 and a radio frequency unit 1612. The RRU 1601 is mainly configured to send and receive a radio frequency signal and perform conversion between a radio frequency signal and a baseband signal. The RRU 1601 and the BBU 1602 is physically disposed together, or is physically separate, for example, in a distributed base station.

The BBU 1602 is a control center of the network device, is also be referred to as a processing unit, and is mainly configured to perform baseband processing functions, such as channel coding, multiplexing, modulation, and spectrum spreading.

In an embodiment, the BBU 1602 includes one or more boards. A plurality of boards jointly support a radio access network (such as an LTE network) of a single access standard, or separately support radio access networks (such as an LTE network, a 5G network, or another network) of different access standards. The BBU 1602 further includes a memory 1621 and a processor 1622. The memory 1621 is configured to store necessary instructions and data. The processor 1622 is configured to control the network device to perform a necessary action. The memory 1621 and the processor 1622 serve the one or more boards. In other words, the memory and the processor is disposed on each board.

Alternatively, a plurality of boards share a same memory and a same processor. In addition, a necessary circuit is further disposed on each board.

The network device 160 shown in FIG. 9 performs S101 and S102 in FIGS. 2, S101, S102, S103, S104, and S105 in FIG. 3, and/or an action performed by the network device in another process described in at least one embodiment. Operations, functions, or operations and functions of each module in the network device 160 are separately set to implement corresponding procedures in the foregoing method embodiments. For details, refer to the descriptions in the foregoing method embodiments. To avoid repetition, detailed descriptions are properly omitted herein.

In an implementation process, the steps of the methods in embodiments is completed by using a hardware integrated logic circuit in the processor, or by using instructions in a form of software. The steps in the methods disclosed with reference to at least one embodiment are directly performed by a hardware processor, or is performed by a combination of hardware in the processor and a software module.

The processor at least one embodiment includes but is not limited to at least one of the following computing devices that run software: a central processing unit (CPU), a microprocessor, a digital signal processor (DSP), a microcontroller unit (MCU), an artificial intelligence processor, or the like. Each computing device includes one or more cores configured to execute software instructions to perform an operation or processing. The processor is an independent semiconductor chip, or is integrated with another circuit to form a semiconductor chip. For example, a system-on-a-chip (SoC) includes the processor and another circuit (for example, an encoding/decoding circuit, a hardware acceleration circuit, or various buses and interface circuits). Alternatively, the processor is integrated into an ASIC as a built-in processor of the ASIC, and the ASIC integrated with the processor is independently packaged or is packaged with another circuit. In addition to including the core configured to execute the software instructions to perform the operation or processing, the processor further includes a hardware accelerator, for example, a field programmable gate array (FPGA), a programmable logic device (PLD), or a logic circuit that implements a dedicated logic operation.

The memory in at least one embodiment includes at least one of the following types: a read-only memory (ROM) or another type of static storage device that stores static information and instructions, or a random access memory (RAM) or another type of dynamic storage device that stores information and instructions, or is an electrically erasable programmable read-only memory (EEPROM). In some scenarios, the memory is alternatively a compact disc read-only memory (CD-ROM) or another compact disc storage medium, an optical disc storage medium (including a compact disc, a laser disc, an optical disc, a digital versatile disc, a Blu-ray disc, and the like), a magnetic disk storage medium or another magnetic storage device, or any other medium that is configured to carry or store expected program code in a form of instructions or a data structure and that is accessed by a computer. However, the memory is not limited thereto.

At least one embodiment further provides a non-transitory computer-readable storage medium, including instructions. In response to the instructions being run on a computer, the computer is enabled to perform any one of the foregoing methods.

At least one embodiment further provides a computer program product including instructions. In response to the computer program product running on a computer, the computer is enabled to perform any one of the foregoing methods.

At least one embodiment further provides a communication system, including the foregoing network device and the foregoing terminal device.

At least one embodiment further provides a chip. The chip includes a processor and an interface circuit, where the interface circuit is coupled to the processor. The processor is configured to run a computer program or instructions, to implement the foregoing methods. The interface circuit is configured to communicate with another module outside the chip.

All or some of the foregoing embodiments is implemented by using software, hardware, firmware, or any combination thereof. In response to a software program being used to implement embodiments, all or some of embodiments is implemented in a form of a computer program product. The computer program product includes one or more computer instructions. In response to the computer program instructions being loaded and executed on a computer, the procedures or functions according to at least one embodiment are all or partially generated. The computer is a general-purpose computer, a special-purpose computer, a computer network, or another programmable apparatus. The computer instructions is stored in a computer-readable storage medium or is transmitted from a computer-readable storage medium to another computer-readable storage medium. For example, the computer instructions is transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium is any usable medium accessible by a computer, or a data storage device integrating one or more usable media, for example, a server or a data center. The usable medium is a magnetic medium (for example, a floppy disk, a hard disk, or a magnetic tape), an optical medium (for example, a DVD), a semiconductor medium (for example, a solid-state drive (SSD)), or the like.

In a process of implementing at least one embodiment, a person skilled in the art understands and implements another variant of disclosed embodiments by viewing the accompanying drawings, disclosed content, and the appended claims. In the claims, "comprising" does not exclude another component or another step, and "a" or "one" does not exclude a case of "a plurality of". A single processor or another unit implements several functions enumerated in the claims. Some measures are described in dependent claims that are different from each other, but this does not mean that the measures cannot be combined to produce a good effect.

Although at least one embodiment is described with reference to specific features thereof, various modifications and combinations are able to be made. Correspondingly, this specification and the accompanying drawings are merely example descriptions of at least one embodiment defined by the appended claims, and are considered as any of or all modifications, variants, combinations, or equivalents that cover the scope of at least one embodiment. A person skilled in the art is able to make various modifications and variants to embodiments described herein without departing from the spirit and scope of the descriptions herein. Embodiments described herein are intended to cover these modifications and variants provided that they fall within the scope of the claims and equivalent technologies thereof.

What is claimed is:

1. A communication method, comprising:
sending downlink control information (DCI) on a physical downlink control channel (PDCCH) monitoring occasion, wherein the DCI includes indication information, wherein the indication information indicates that a channel state information reference signal (CSI-RS) is available, the CSI-RS corresponds to a synchronization signal block (SSB), and the SSB corresponds to the PDCCH monitoring occasion; and
sending the CSI-RS.

2. The communication method according to claim 1, wherein the sending the CSI-RS includes sending the CSI-RS in a time window.

3. The communication method according to claim 1, wherein the sending the CSI-RS includes sending the CSI-RS in a slot, wherein the slot is in a time window and is followed by the PDCCH monitoring occasion.

4. The communication method according to claim 1, wherein the PDCCH monitoring occasion belongs to a paging occasion (PO).

5. A communication method, comprising:
receiving downlink control information (DCI) on a physical downlink control channel (PDCCH) monitoring occasion, wherein the DCI includes an indication information, the indication information indicates that a channel state information reference signal (CSI-RS) is available, the CSI-RS corresponds to a synchronization signal block (SSB), and the SSB corresponds to the PDCCH monitoring occasion; and
receiving the CSI-RS.

6. The communication method according to claim 5, wherein the receiving the CSI-RS includes receiving the CSI-RS in a time window.

7. The communication method according to claim 5, wherein the receiving the CSI-RS includes receiving the CSI-RS in a slot, wherein the slot is in a time window and is followed by the PDCCH monitoring occasion.

8. The communication method according to claim 5, wherein the PDCCH monitoring occasion belongs to a paging occasion (PO).

9. A communication apparatus, comprising:
non-transitory memory storing instructions; and
one or more processors in communication with the memory, wherein the instructions, in response to being executed by the one or more processors, cause the processor to:
send at least one piece of downlink control information (DCI) on a physical downlink control channel (PDCCH) monitoring occasion, wherein the DCI includes an indication information, wherein the indication information indicates that a channel state information reference signal (CSI-RS) is available, the CSI-RS corresponds to a synchronization signal block (SSB), and the SSB corresponds to the PDCCH monitoring occasion; and
send the CSI-RS.

10. The communication apparatus according to claim 9, wherein the processor sends the CSI-RS in a time window.

11. The communication apparatus according to claim 9, wherein the processor sends the CSI-RS in a slot, wherein the slot is in a time window and is.

12. The communication apparatus according to claim 9, wherein the PDCCH monitoring occasion belongs to a paging occasion (PO).

13. Communication apparatus, comprising:
non-transitory memory storing instructions; and
one or more processors in communication with the memory, wherein the instructions, in response to being executed by the one or more processors, cause the processor to:
receive downlink control information (DCI) on a physical downlink control channel (PDCCH) monitoring occasion, wherein the DCI includes an indication information, the indication information indicates that a channel state information reference signal (CSI-RS) is available, the CSI-RS corresponds to a synchronization signal block (SSB), and the SSB corresponds to the PDCCH monitoring occasion; and
receive the CSI-RS.

14. The communication apparatus according to claim 13, wherein the receiving the CSI-RS includes receiving the CSI-RS in a time window.

15. The communication apparatus according to claim 13, wherein the receiving the CSI-RS includes receiving the CSI-RS in a slot, wherein the slot is in a time window and is followed by the PDCCH monitoring occasion.

16. The communication apparatus according to claim 13, wherein the PDCCH monitoring occasion belongs to a paging occasion (PO).

17. The communication method according to claim 1, further comprising:
sending measurement configuration information for measuring a quality of a CSI-RS resource associated with the CSI-RS; and
receiving a report on the quality of the CSI-RS resource associated with the CSI-RS.

18. The communication method according to claim 5, further comprising:
receiving measurement configuration information for measuring a quality of a CSI-RS resource associated with the CSI-RS;
measuring the quality of the CSI-RS resource associated with the CSI-RS based the measurement configuration information; and
sending a report on the quality of the CSI-RS resource associated with the CSI-RS.

19. The communication apparatus according to claim 9, wherein the processor is further configured to:
send measurement configuration information for measuring a quality of a CSI-RS resource associated with the CSI-RS; and
receive a report on the quality of the CSI-RS resource associated with the CSI-RS.

20. The communication apparatus according to claim 13, wherein the instructions, in response to being executed by the one or more processors, further cause the processor to:
receive measurement configuration information for measuring a quality of a CSI-RS resource associated with the CSI-RS;
measure the quality of the CSI-RS resource associated with the CSI-RS based the measurement configuration information; and
send a report on the quality of the CSI-RS resource associated with the CSI-RS.

* * * * *